United States Patent
Shoykher et al.

(10) Patent No.: US 9,819,986 B2
(45) Date of Patent: Nov. 14, 2017

(54) AUTOMATED DLNA SCANNING WITH NOTIFICATION

(71) Applicant: Flextronics AP, LLC, San Jose, CA (US)

(72) Inventors: Mikhail Shoykher, Thornhill (CA); John S. Visosky, Gormley (CA); Sanjiv Sirpal, Oakville (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 14/821,365

(22) Filed: Aug. 7, 2015

(65) Prior Publication Data

US 2016/0044362 A1    Feb. 11, 2016

Related U.S. Application Data

(63) Continuation of application No. 13/969,205, filed on Aug. 16, 2013, now abandoned, and a continuation of
(Continued)

(51) Int. Cl.
*G06F 3/00*    (2006.01)
*G06F 13/00*    (2006.01)
(Continued)

(52) U.S. Cl.
CPC ... *H04N 21/4131* (2013.01); *H04N 21/43615* (2013.01); *H04N 21/4782* (2013.01); *H04N 21/4882* (2013.01)

(58) Field of Classification Search
CPC ............. H04N 21/40; H04N 21/4104; H04N 21/4108; H04N 21/436; H04N 21/43615
(Continued)

(56) References Cited

U.S. PATENT DOCUMENTS 8,868,666 B1 * 10/2014 Hellwege ........... H04N 21/4627
709/203
2009/0129340 A1    5/2009 Handa
(Continued)

FOREIGN PATENT DOCUMENTS

EP    2328346    6/2011
EP    2487922    8/2012

OTHER PUBLICATIONS

English Translation of U.S. Pub. 2013/0081083 A1 with Foreign Application Priority Data KR 10-2011-0097484.*
(Continued)

*Primary Examiner* — Kyu Chae
(74) *Attorney, Agent, or Firm* — Sheridan Ross P.C.

(57) ABSTRACT

A Digital Living Network Alliance (DLNA) subservice module for an intelligent television (TV) is configured to run periodic discovery scans for DLNA devices on a local network. The DLNA subservice module retrieves status data for DLNA devices connected to the network, updates an internal status data for the DLNA device using the retrieved data, and notifying a media scanner module of the Intelligent TV with the updated internal status data. The DLNA subservice module further works with internal provider modules of the Intelligent TV that deals with non-DLNA devices. The media browser includes a plug-in for retrieving metadata from DLNA content servers in addition to non-DLNA devices. The media scanner aggregates unified metadata retrieved from media browser content provider modules that includes data from DLNA devices.

18 Claims, 24 Drawing Sheets

Related U.S. Application Data application No. 13/969,190, filed on Aug. 16, 2013, now abandoned, and a continuation of application No. 13/969,201, filed on Aug. 16, 2013, now abandoned, and a continuation of application No. 13/970,234, filed on Aug. 19, 2013, now Pat. No. 9,185,324, and a continuation of application No. 13/970,243, filed on Aug. 19, 2013, now abandoned, and a continuation of application No. 13/970,247, filed on Aug. 19, 2013, now Pat. No. 9,369,654, and a continuation of application No. 14/407,609, filed as application No. PCT/US2013/036804 on Apr. 16, 2013, now abandoned.

(60) Provisional application No. 61/684,672, filed on Aug. 17, 2012, provisional application No. 61/702,650, filed on Sep. 18, 2012, provisional application No. 61/697,710, filed on Sep. 6, 2012, provisional application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.
*H04N 5/445* (2011.01)
*H04N 21/41* (2011.01)
*H04N 21/436* (2011.01)
*H04N 21/4782* (2011.01)
*H04N 21/488* (2011.01)

(58) Field of Classification Search
USPC .......................................................... 725/59
See application file for complete search history.

(56) References Cited

U.S. PATENT DOCUMENTS

| | | |
|---|---|---|
| 2009/0160764 A1 | 6/2009 | Myllymäki |
| 2010/0175098 A1* | 7/2010 | Zustak ................ H04L 12/2807 725/109 |
| 2010/0306402 A1 | 12/2010 | Russell et al. |
| 2011/0119626 A1 | 5/2011 | Faenger et al. |
| 2012/0144422 A1 | 6/2012 | Han et al. |
| 2012/0151006 A1 | 6/2012 | McInerney et al. |
| 2012/0209916 A1* | 8/2012 | Azuma ................ H04L 12/2814 709/204 |
| 2012/0221972 A1 | 8/2012 | Dougall et al. |
| 2012/0257108 A1 | 10/2012 | Friedlander et al. |
| 2012/0260284 A1 | 10/2012 | Friedlander et al. |
| 2012/0297429 A1* | 11/2012 | Reed et al. ...................... 725/86 |
| 2013/0081083 A1* | 3/2013 | Yu et al. ........................ 725/40 |
| 2013/0226895 A1* | 8/2013 | Gauthier ........... G06F 17/30017 707/709 |
| 2014/0053222 A1* | 2/2014 | Shoykher et al. ............ 725/110 |

OTHER PUBLICATIONS

International Search Report and Written Opinion for International (PCT) Patent Application No. PCT/US13/55379, dated Dec. 6, 2013 8 pages.

International Preliminary Report for International (PCT) Patent Application No. PCT/US2013/055379, dated Apr. 2, 2015 8 pages.

Official Action for U.S. Appl. No. 13/969,205, dated May 7, 2015 10 pages.

\* cited by examiner

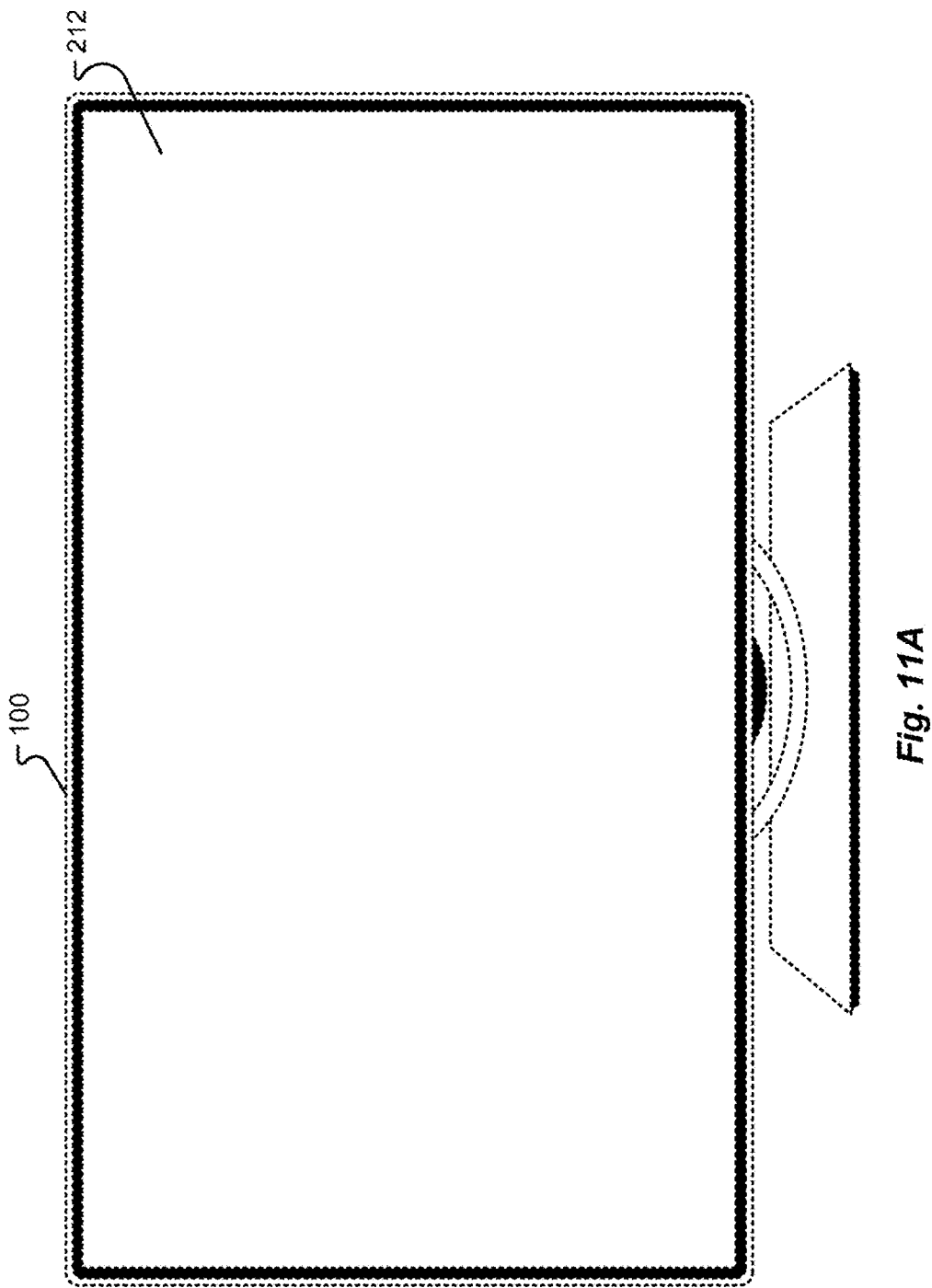

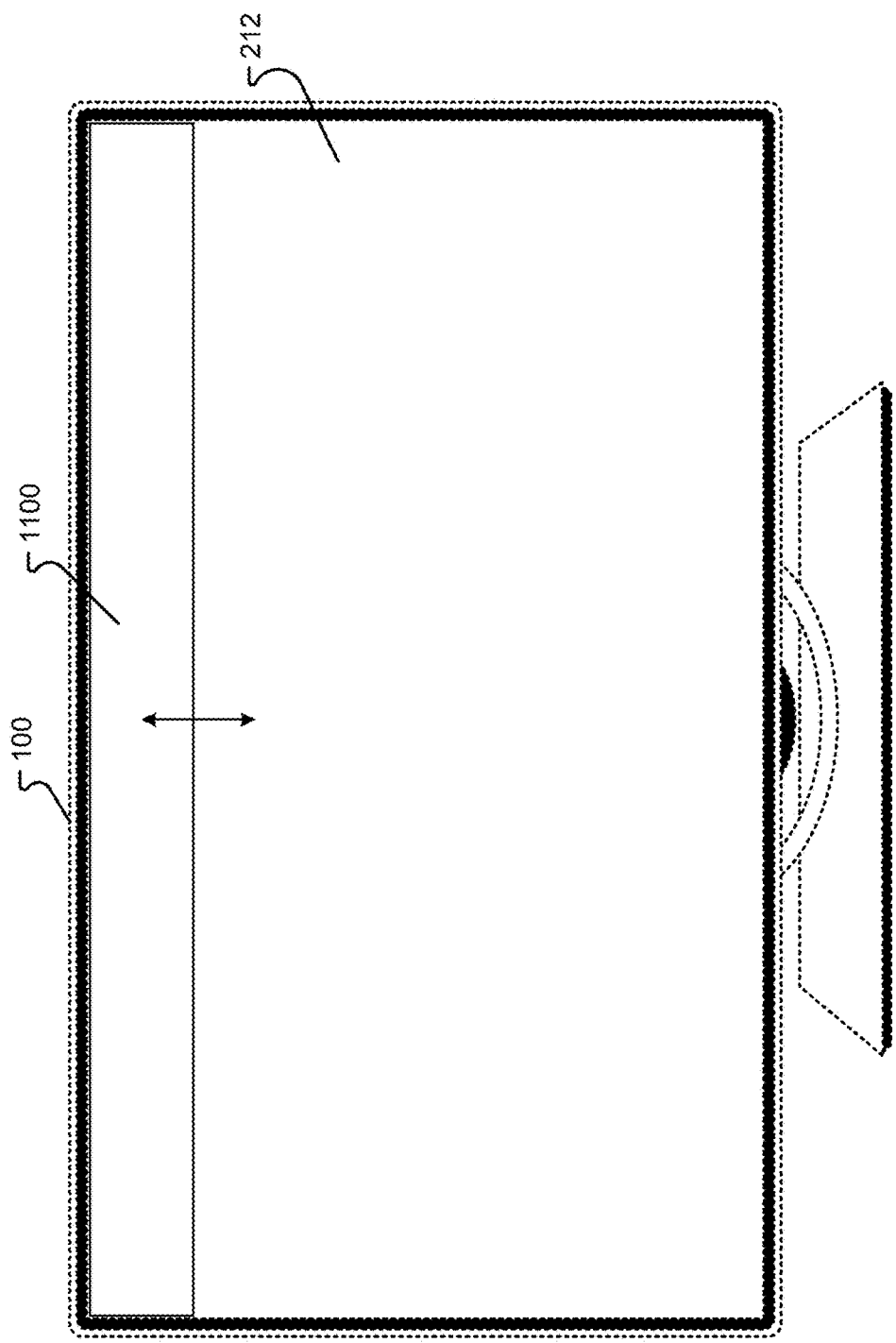

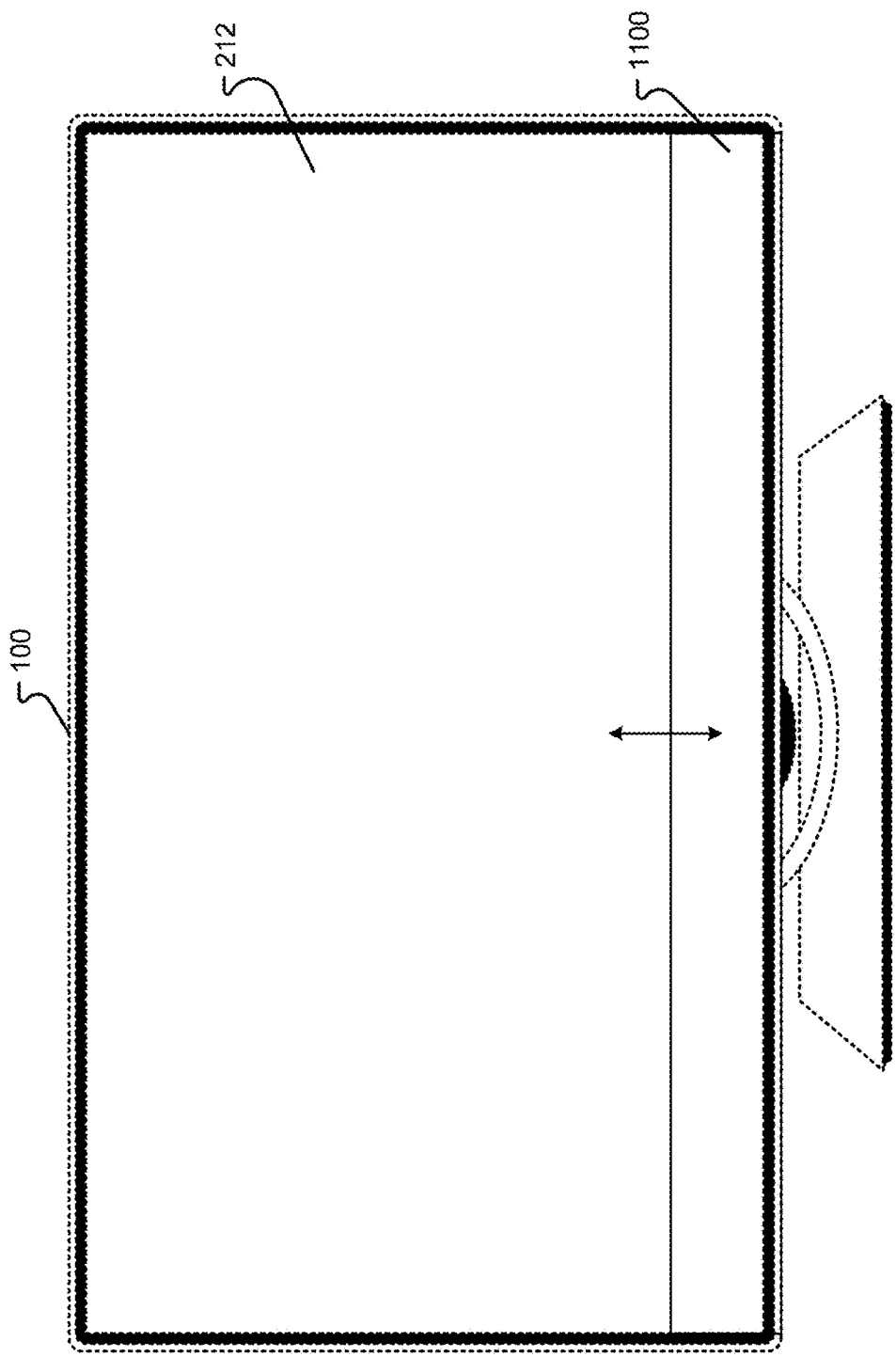

AUTOMATED DLNA SCANNING WITH NOTIFICATION

CROSS REFERENCE TO RELATED APPLICATIONS

This Application is a continuation of and claims priority to U.S. patent application Ser. Nos.: (1) 13/969,205, filed on Aug. 16, 2013, entitled "AUTOMATED DLNA SCANNING WITH NOTIFICATION"; (2) 13/969,190, filed on Aug. 16, 2013, entitled "Data Service"; (3) 13/969,201, filed on Aug. 16, 2013, entitled "Data Service Function"; (4) 13/970,234, filed on Aug. 19, 2013, entitled "Sourcing EPG Data"; (5) 13/970,243, filed on Aug. 19, 2013, entitled "EPG Data Functions"; (6) 13/970,247, filed on Aug. 19, 2013, entitled "EPG Data Interface"; and (7) 14/407,609, filed on Dec. 12, 2014, entitled "EPG Aggregation From Multiple Sources,"which is a national stage application under 35 U.S.C. 371 of PCT Application No. PCT/US13/36804, having an international filing data of Apr. 16, 2013; each of which claims priority to U.S. Provisional Application Ser. No. 61/684,672 filed on Aug. 17, 2012, "Smart TV"; 61/702,650 filed on Sep. 18, 2012, "Smart TV"; 61/697,710 filed on Sep. 6, 2012, "Social TV"; 61/700,182 filed on Sep. 12, 2012, "Social TV Roadmap"; 61/736,692 filed on Dec. 13, 2012, "SmartTV"; 61/798,821 filed on Mar. 15, 2013, "SmartTV"; 61/804,942 filed on Mar. 25, 2013, "SmartTV"; 61/804,998 filed on Mar. 25, 2013, "SmartTV"; 61/804,971 filed on Mar. 25, 2013, "SmartTV"; 61/804,990 filed on Mar. 25, 2013, "SmartTV"; 61/805,003 filed on Mar. 25, 2013, "SmartTV"; 61/805,053 filed on Mar. 25, 2013, "SmartTV"; 61/805,030 filed on Mar. 25, 2013, "SmartTV"; 61/805,027 filed on Mar. 25, 2013, "SmartTV"; 61/805,042 filed on Mar. 25, 2013, "SmartTV"; and 61/805,038 filed on Mar. 25, 2013. Each of the aforementioned documents is incorporated herein by reference in their entirety for all that they teach and for all purposes.

BACKGROUND

Consolidation of device features or technological convergence is an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

According to the disclosure, a method of managing external devices connected through a network for an Intelligent TV includes retrieving status data for an external device through the network, updating an internal status data for the external device in the Intelligent TV using the retrieved status data, and notifying an internal content provider module of the Intelligent TV with the updated internal status data. The method further includes aggregating the updated internal status data with status data for other devices connected through the network as a unified data.

According to the disclosure, an Intelligent TV includes a DLNA subservice module configured to retrieve status data from a plurality of DLNA devices connected through a network and update internal status data for the external devices in the Intelligent TV using the retrieved status data and an internal content provider module configured to maintain a list of connected media sources of the Intelligent TV using the status data retrieved by the DLNA subservice module. The internal provider modules include a media browser configured to provide a real-time view of media sources of the Intelligent TV and a media scanner configured to populate a media table using data retrieved by the media browser. The media browser includes a plug-in configured to retrieve metadata from the plurality of DLNA devices that are DLNA content servers. The media scanner is configured to aggregate data of DLNA and non-DLNA devices as a unified metadata.

According to the disclosure, a DLNA subservice module for an Intelligent TV is configured to perform the steps retrieving status data of a DLNA device connected through a network, updating an internal status data for the DLNA device in the Intelligent TV using the retrieved status data, and notifying an internal content provider module of the Intelligent TV with the updated internal status data. The DLNA subservice module further aggregates the updated internal status data with status data for other devices connected through the network as a unified data.

The present disclosure can provide a number of advantages depending on the particular aspect, embodiment, and/or configuration.

Each subservice will be able to manage media and/or data from its particular source(s) and further aggregate media and/or data from multiple distinct sources. Alternatively, a particular subservice may further expose the multiple sources to the application levels in an organized and efficient manner.

Subservices will also have access to local storage of media and/or data with defined priority goals such as improved performance or to keep track of transient information.

These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p–1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p–1280×720p: 921,600 pixels (approximately 0.9 megapixels) per frame. As will be appreciated, "frame size" in pixels is defined as number of horizontal pixels× number of vertical pixels, for example 1280×720 or 1920× 1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems, an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉ Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System (GPS) (US), GLONASS (Russia), Galileo positioning system (EU), Compass Navigation System (China), and Regional Navigational Satellite System (India).

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

The term "touch screen" or "touchscreen" refers to a screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, MySpace, Newgrounds, Blip.tv, and Crackle.

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages." The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages is stored in an index database for use in later queries. Some search engines, such as Google™, store all or part of the source page (referred to as a cache) as well as information about the web pages, whereas others, such as AltaVista™, store every word of every page they find.

The terms "online community," "e-community," or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video, text, or avatars.

The term "remote control" refers to a component of an electronic device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellite and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
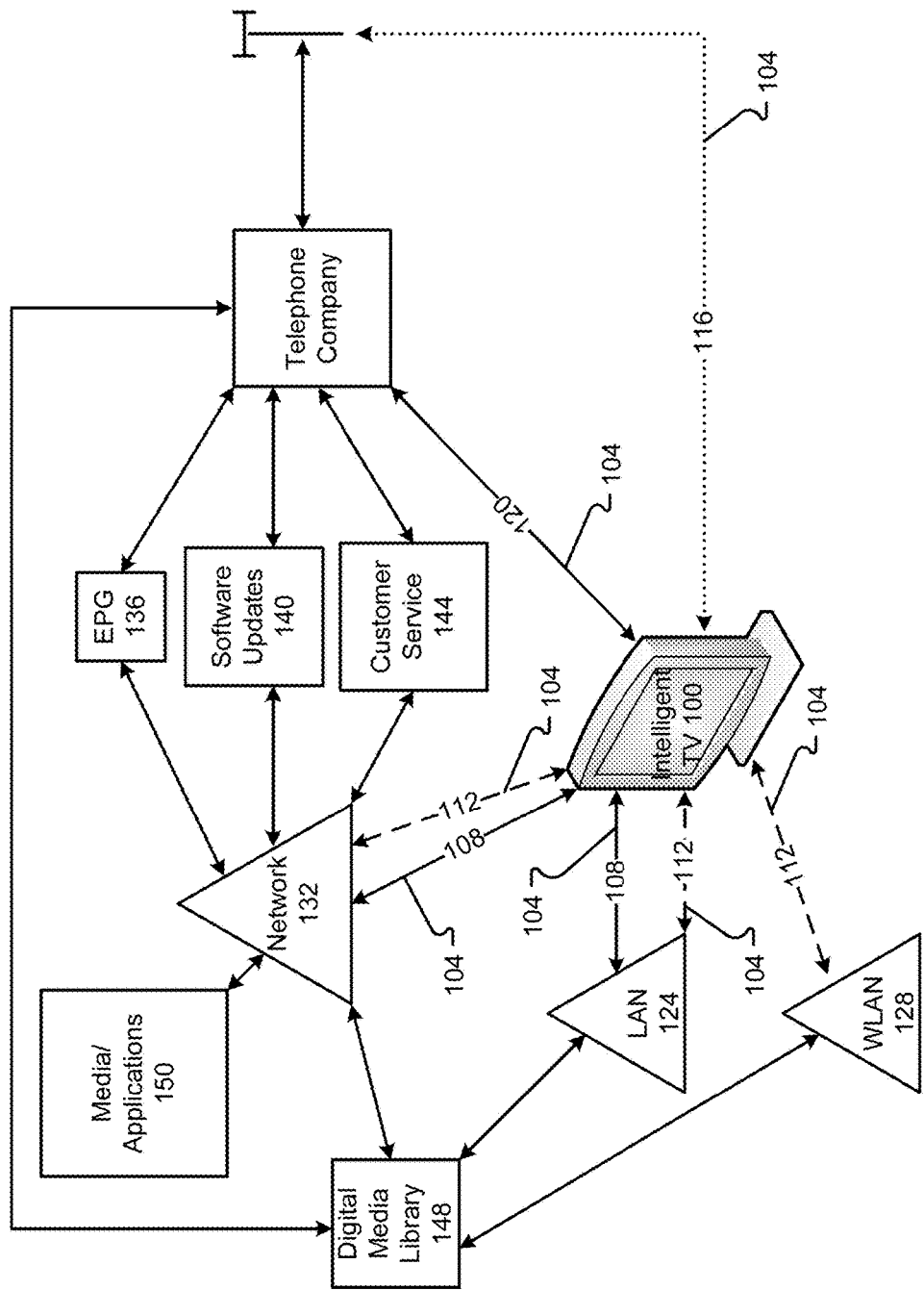
FIG. 1A includes a first view of an embodiment of an environment or an intelligent television.
Figure 1B:
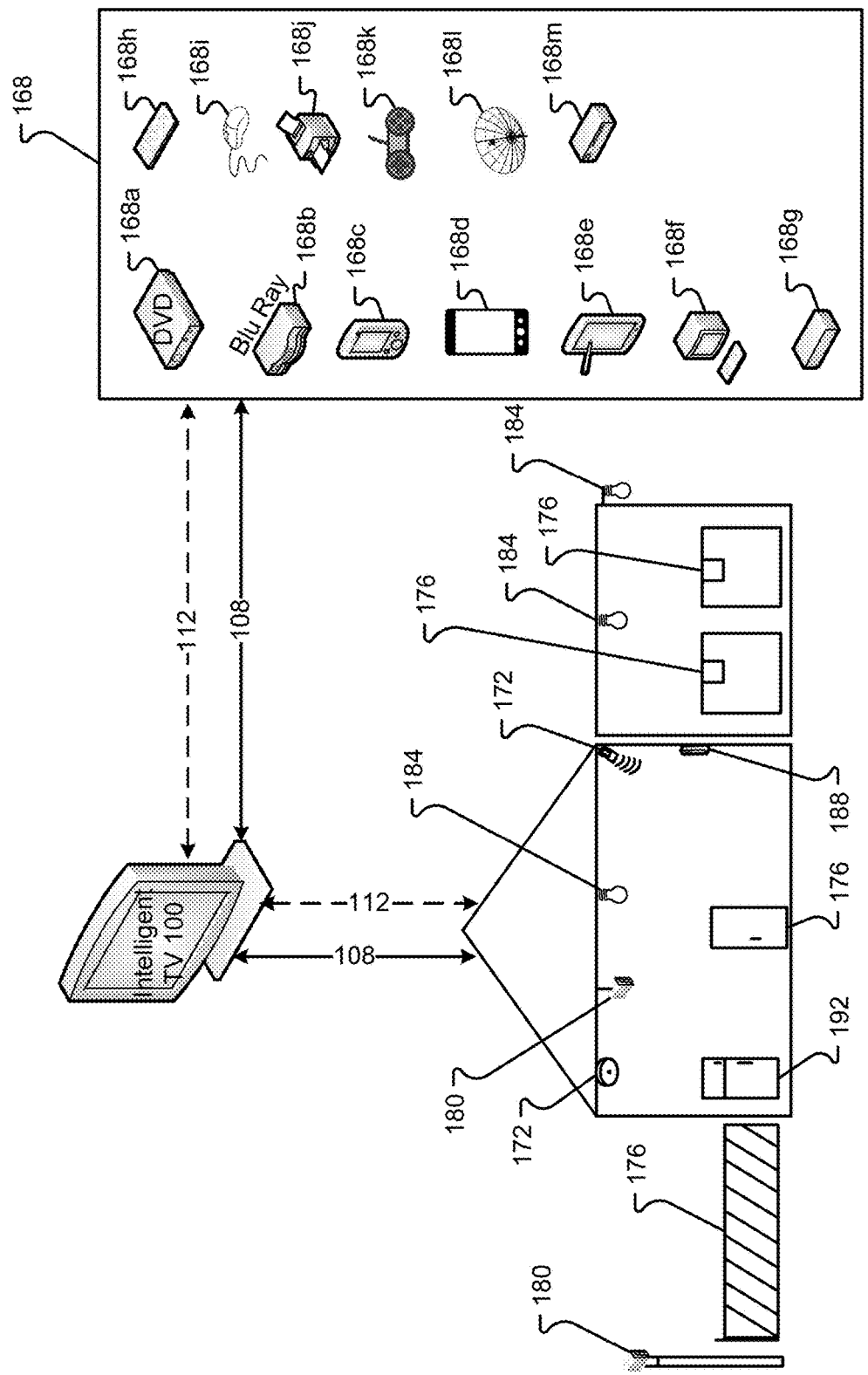
FIG. 1B includes a second view of an embodiment of an environment or an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the intelligent TV 100 can interact with other electronic devices 168 by either the wired 108 and/or wireless 112 connections. As described herein, components of the Intelligent TV 100 allow the device 100 to be connected to devices 168 including, but not limited to, DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), Bluetooth™, or high-definition multimedia interface (HDMI) compliant devices, and/or wireless devices. When connected to an external cable box 168*g* or satellite dish 168*l*, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
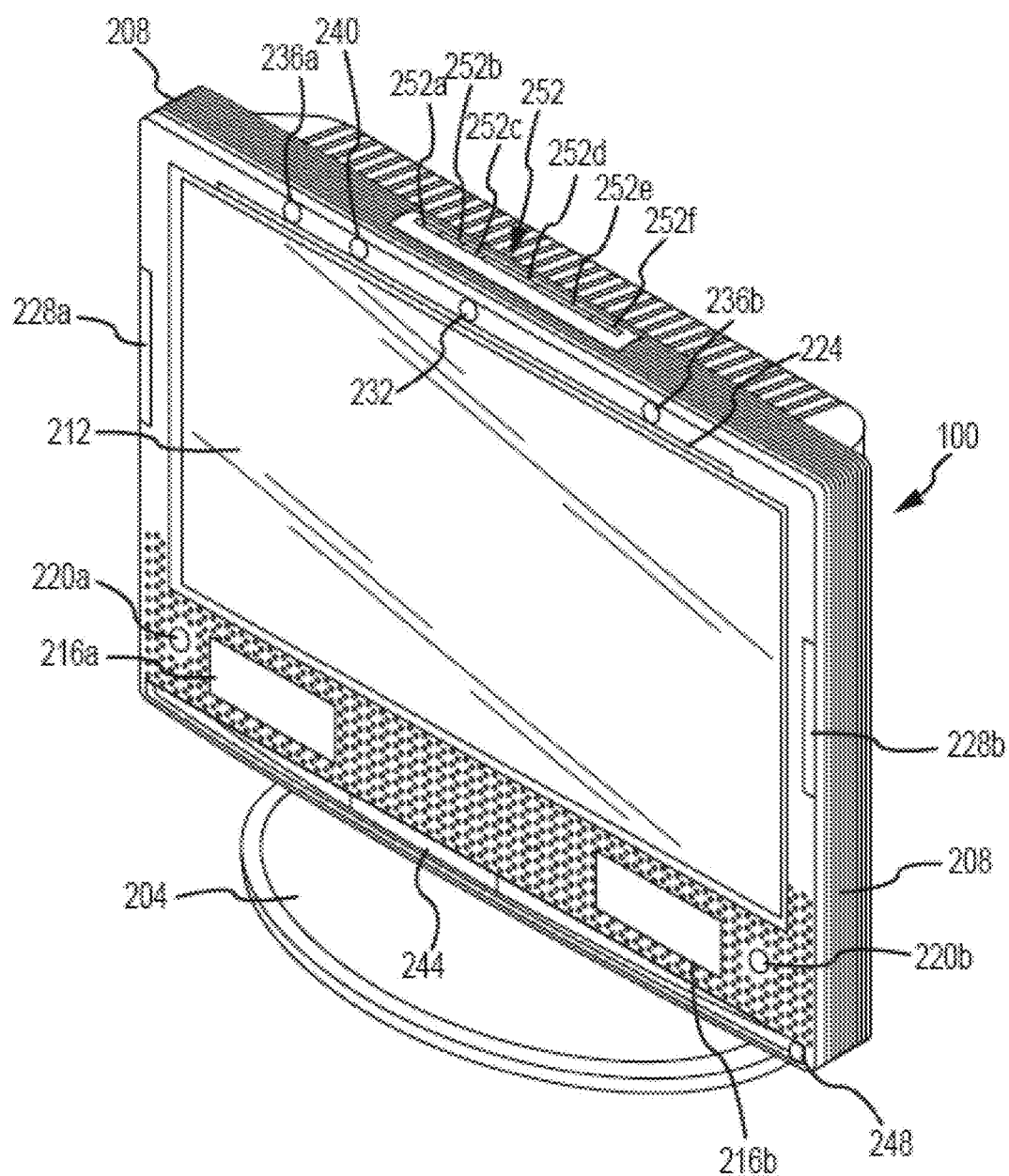
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252*a-f*, which can be configured for specific inputs. For example, the first button 252*a* may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
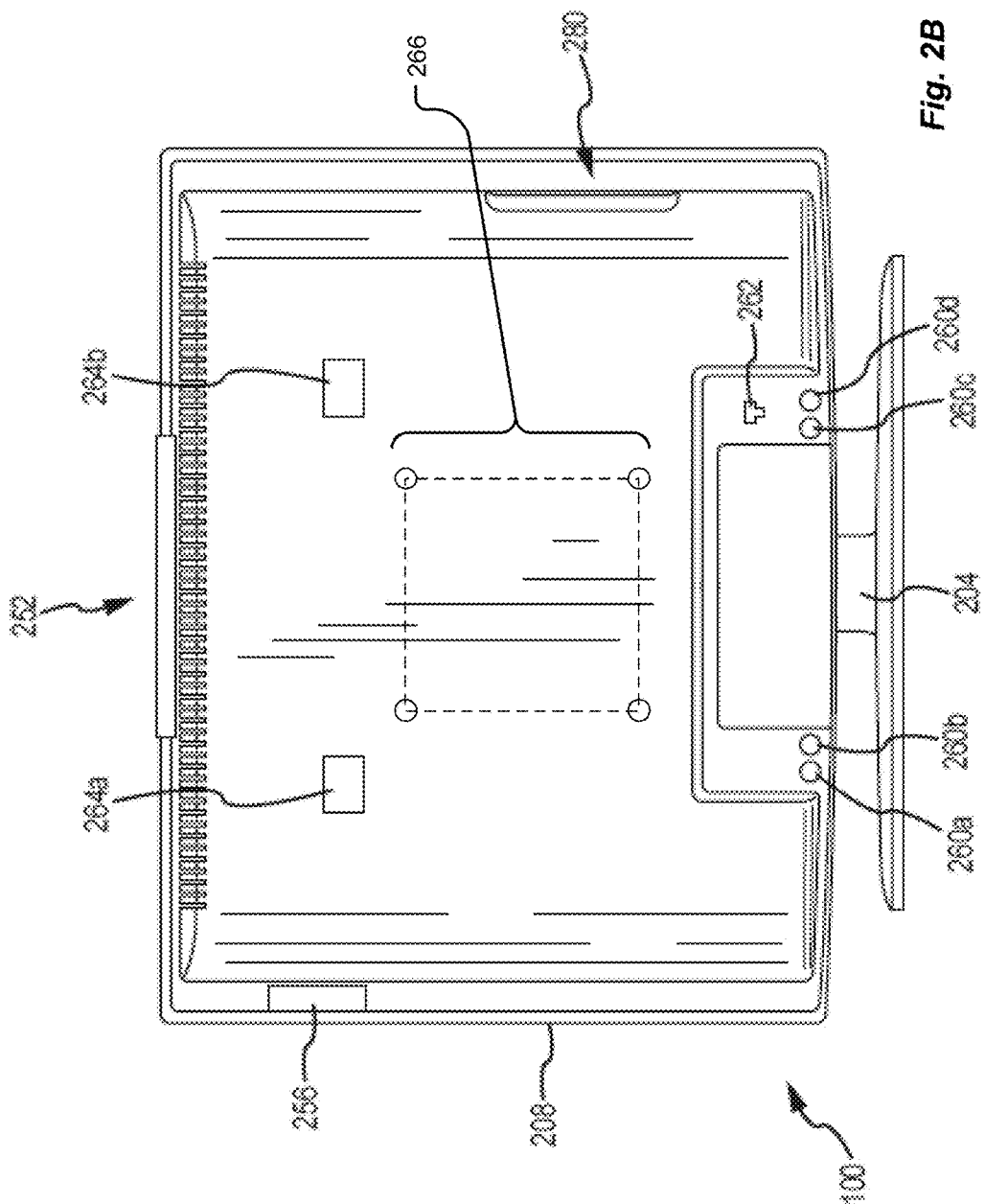
FIG. 2B includes a second view of an embodiment of an intelligent television.

In support of communication functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
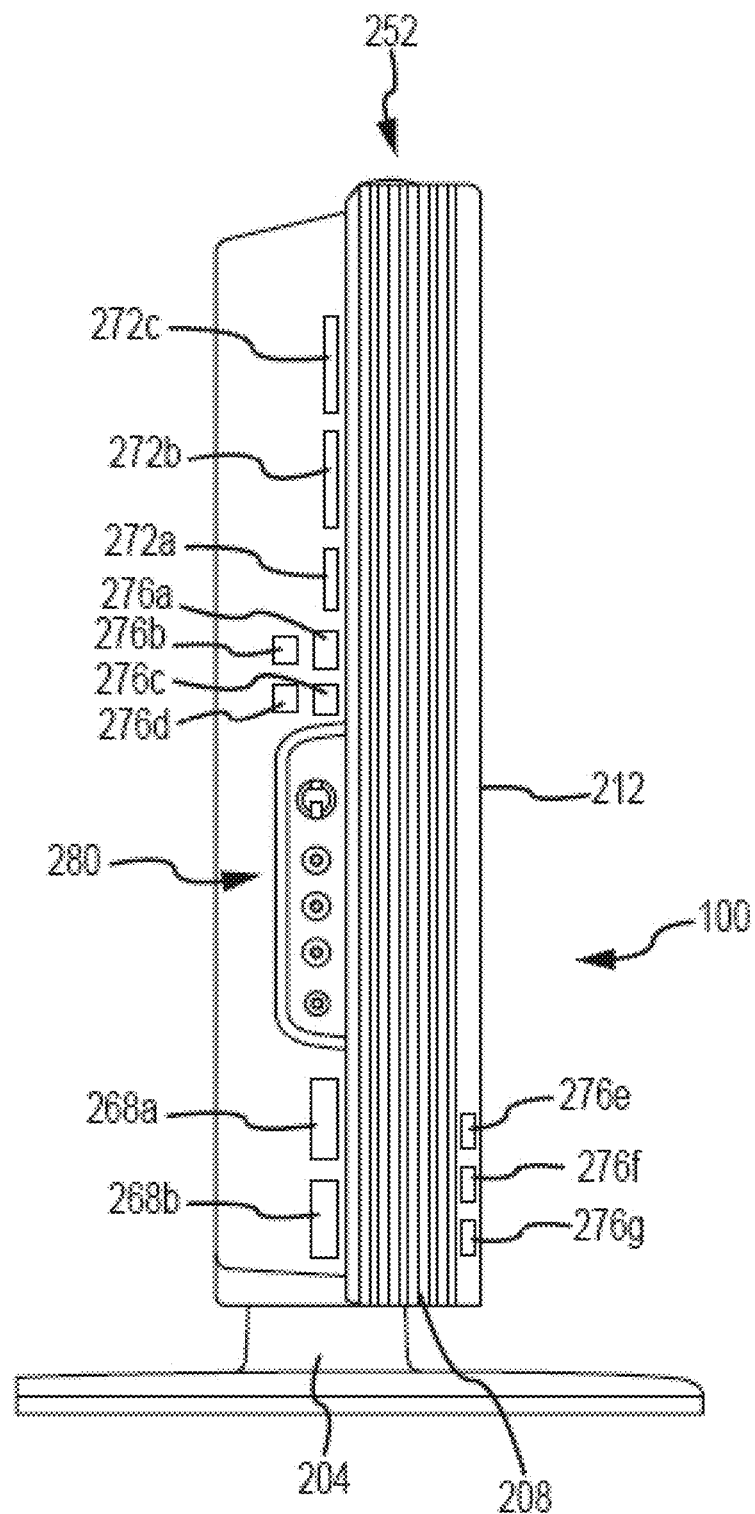
FIG. 2C includes a third view of an embodiment of an intelligent television.
Figure 2D:
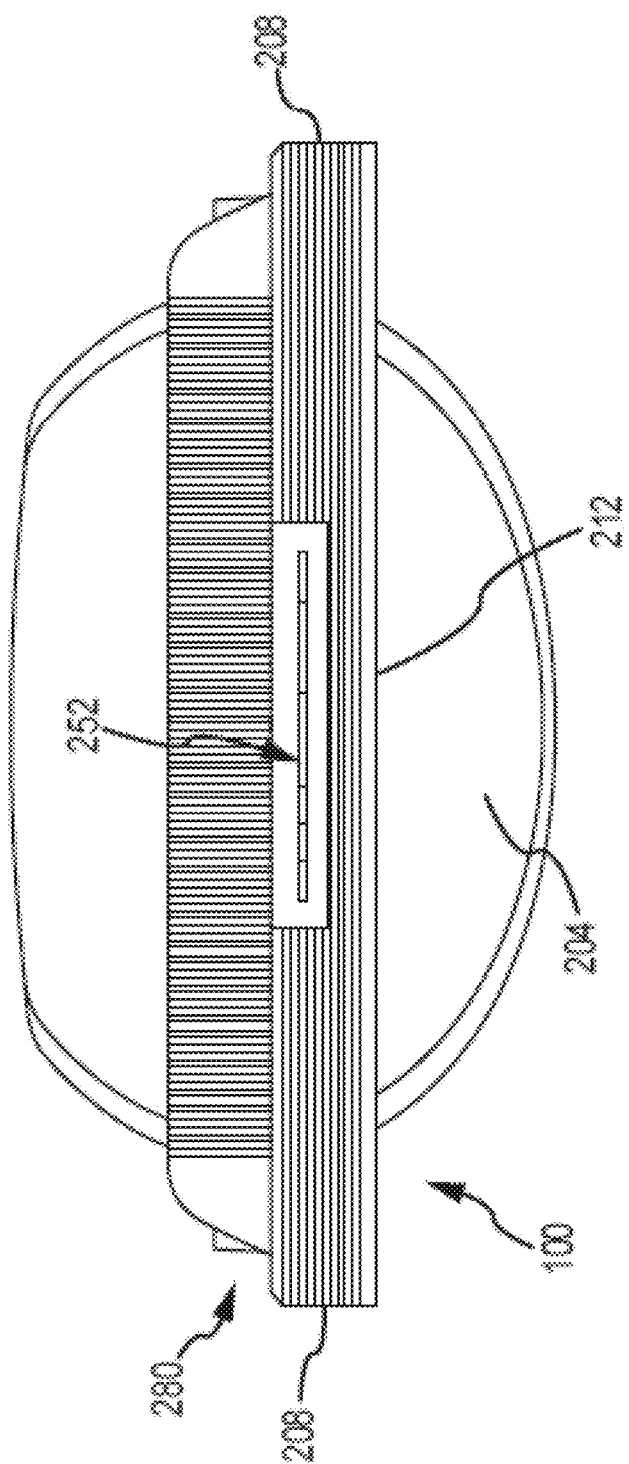
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog to digital converter.

Figure 3:
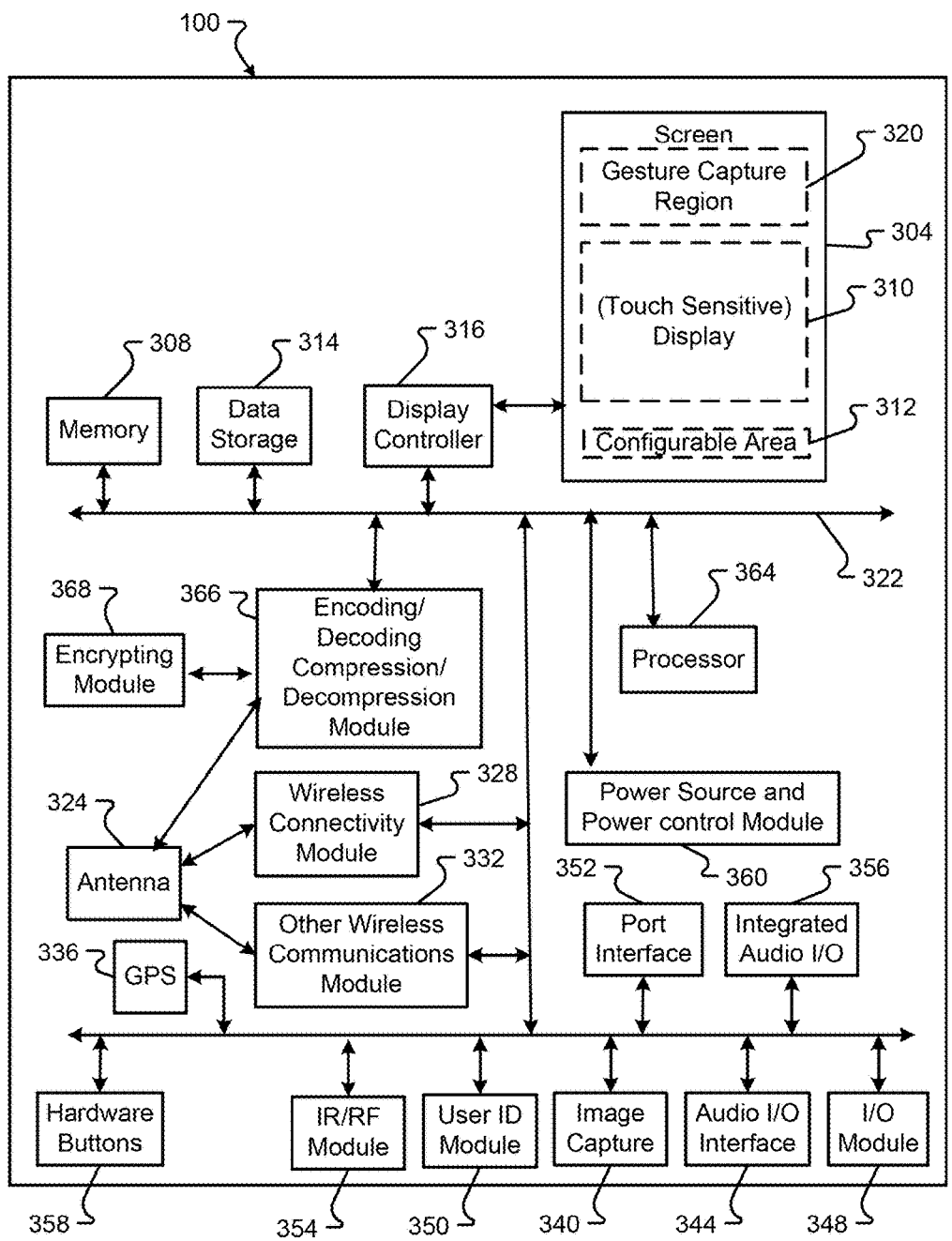
FIG. 3 is a block diagram of an embodiment of the hardware of the intelligent television.

Hardware Features:

FIG. 3 illustrates components of an Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included, for example, for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
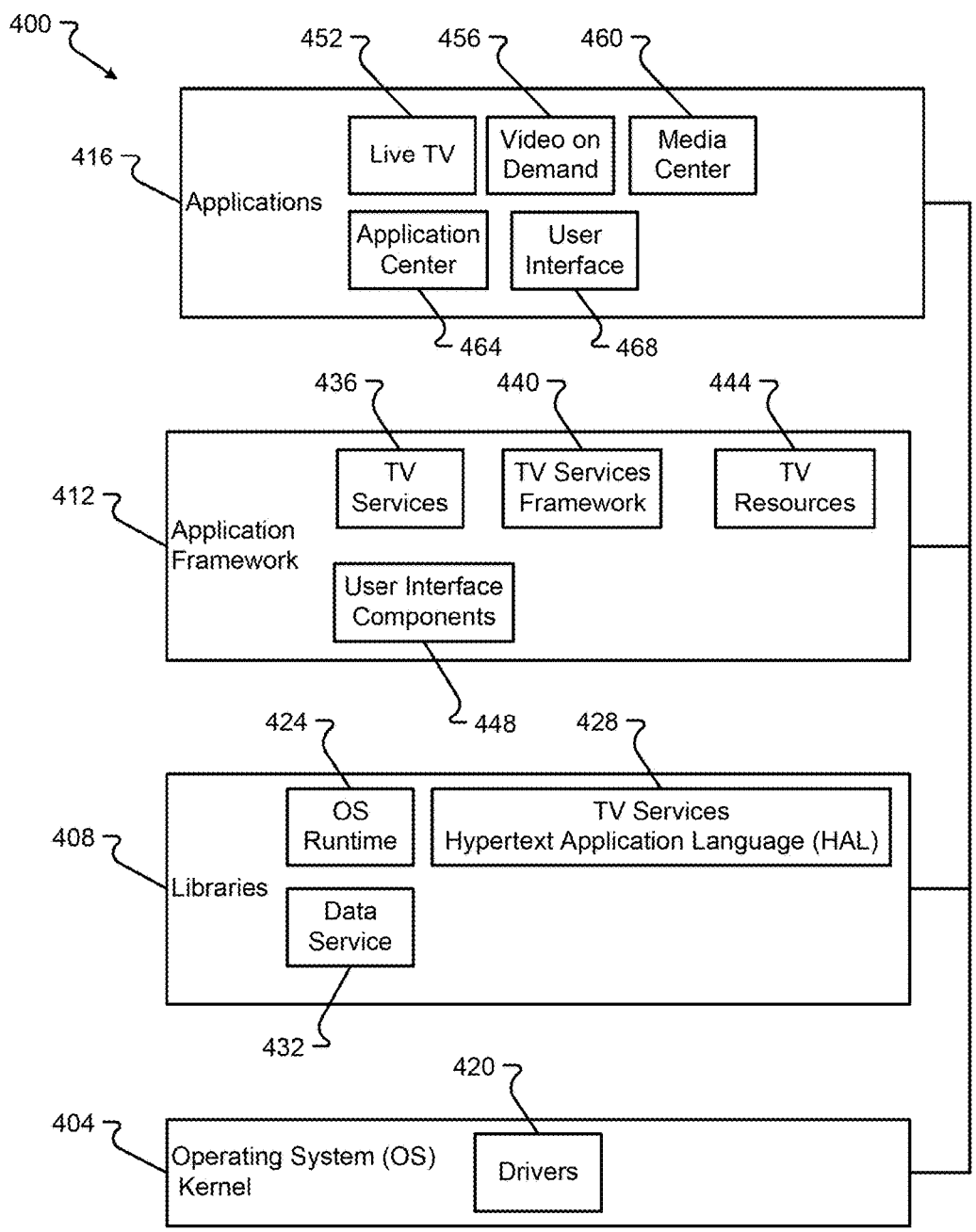
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV 100. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer 428 can include code required by TV services either executed in the application framework 412 or an application 416. The TV services HAL library 428 is specific to the Intelligent TV 100 operations that control different functions of the Intelligent TV 100. The TV service HAL library 428 can also be formed from other types of application languages or embodiments of different types of code or formats for code beyond the hardware abstraction layer.

Figure 6:
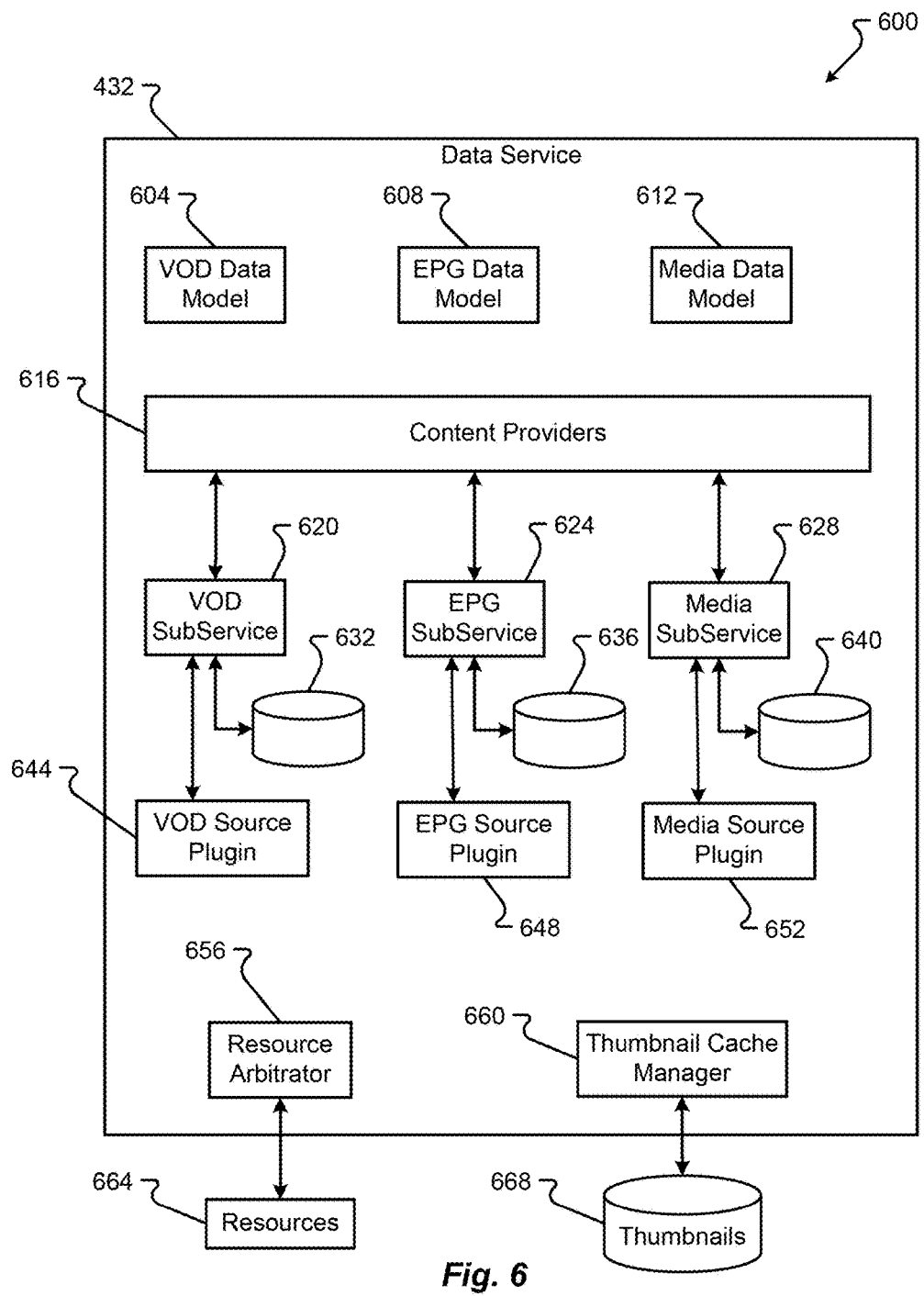
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any types of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application, 452, can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV 100 or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV 100. An application center 464 may obtain these applications from different sources, store them locally and then execute those types of applications for the user on the Intelligent TV 100.

Figure 5:
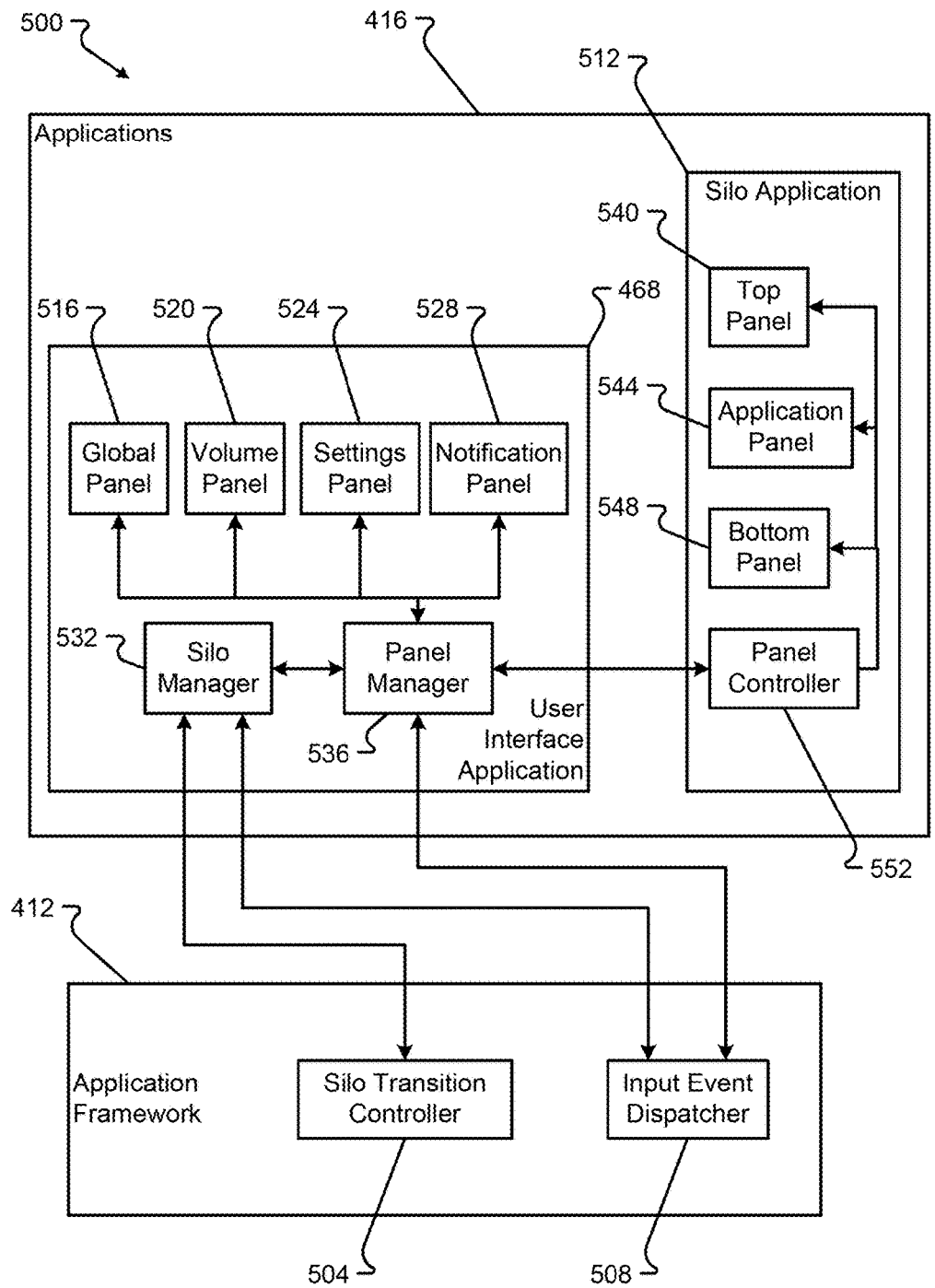
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV 100 that contains information for a user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content provider modules 616. The data subservices 620, 624, and 628 that communicate with the content provider modules 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content provider modules 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further the thumbnail cache manager 660 may extract or retrieve that information from the thumbnails database 668 to provide to one of the data subservices 620, 624, 628.

Figure 13:
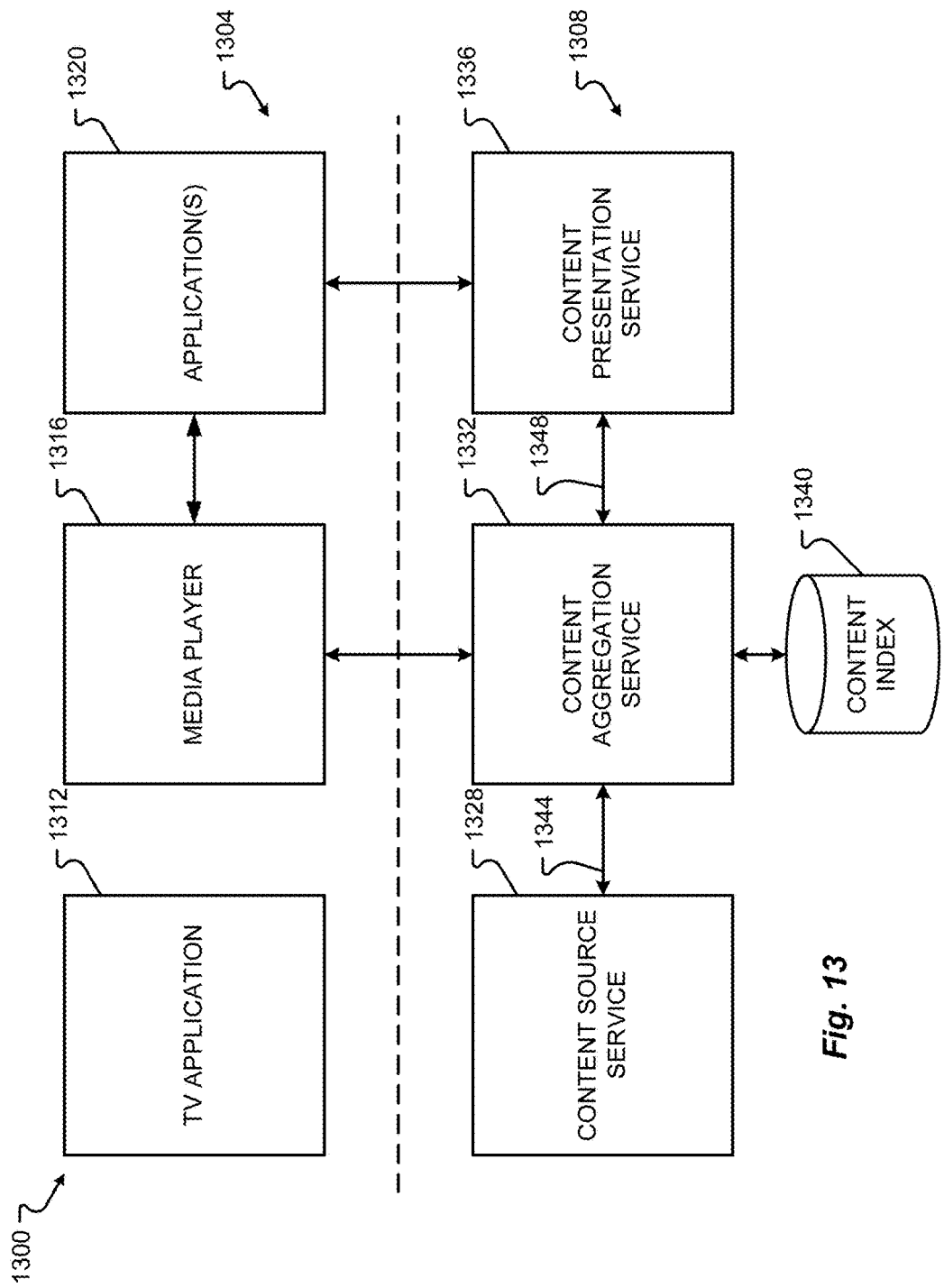
FIG. 13 is a block diagram of an embodiment of a content data service.

An exemplary content aggregation architecture 1300 is shown in FIG. 13. The architecture can include a user interface layer 1304 and a content aggregation layers 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with the user), the user interface layer 1300 disconnects the socket. As shown, media can be provided directly by the content aggregation service 1332 to the media player 1316 for presentation to the user.

Figure 7:
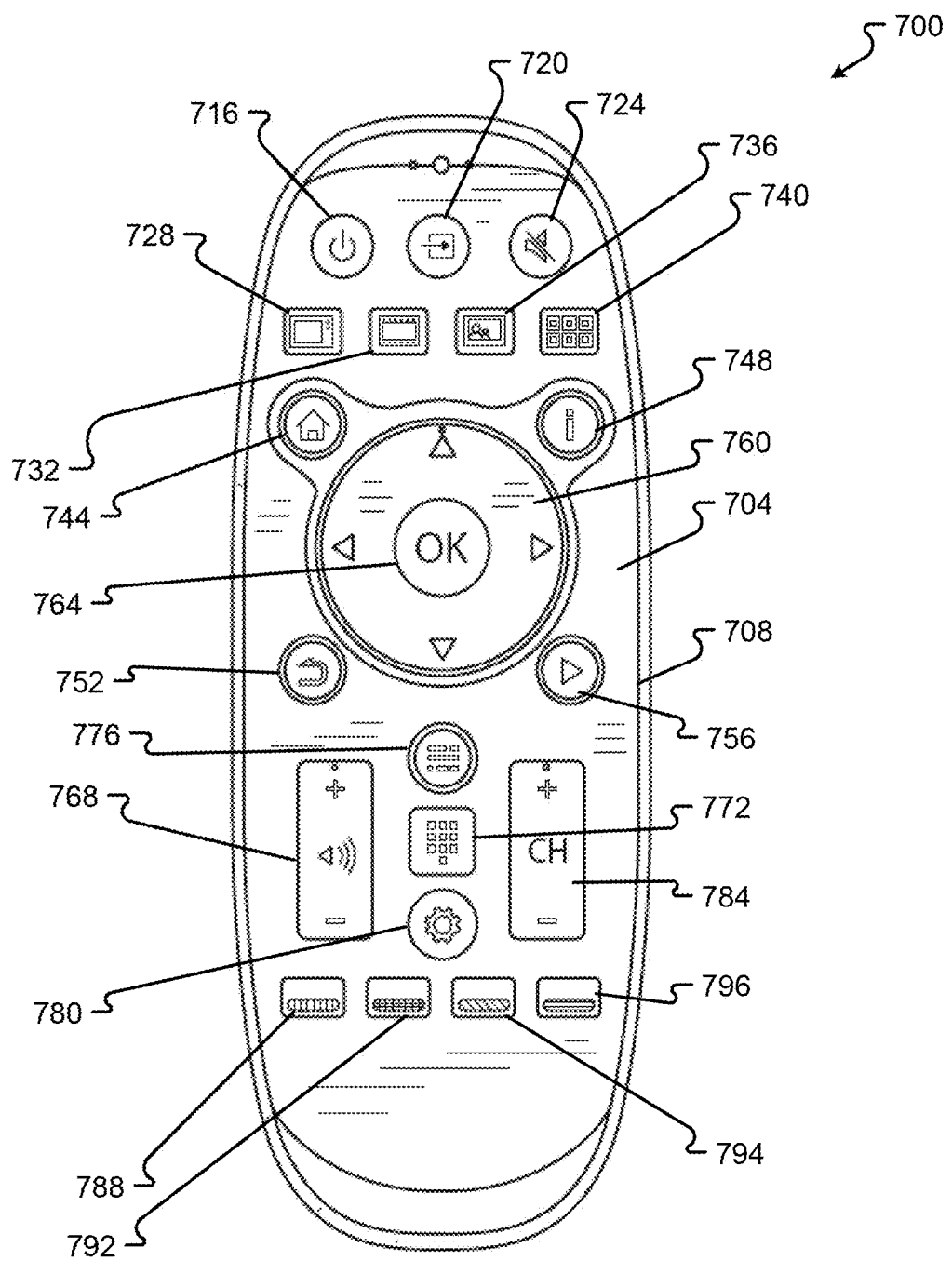
FIG. 7 is a plan view of an embodiment of a handheld remote control.
Figure 8:
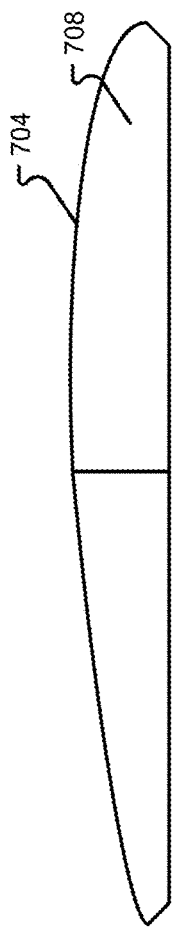
FIG. 8 is a side view of an embodiment of a remote control.
Figure 9A:
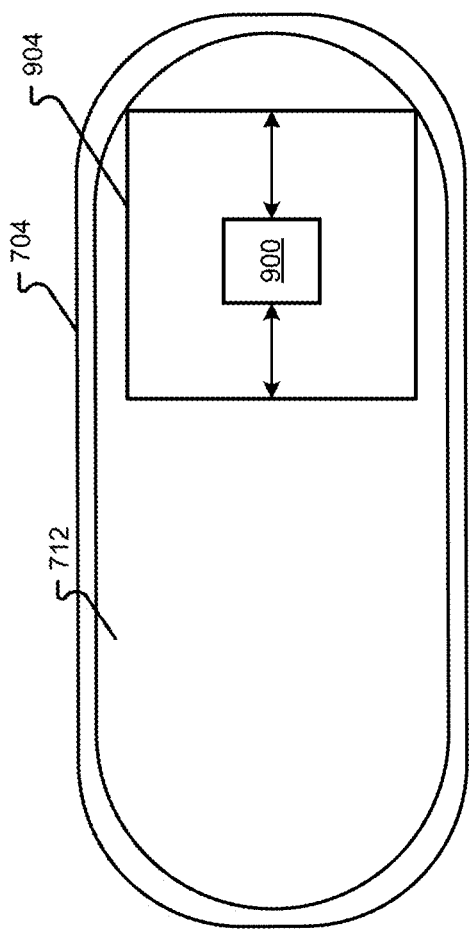
FIG. 9A is a bottom view of an embodiment of a remote control with a joystick in a neutral position.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780, which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can include previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include a web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can identify one or more of the selected application, provide a description of the functionality (including application developer and/or vendor, version, release, and/or last update date and a category or type of application based on the application's functionality) and user ratings and/or degree of other user(s), downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add," and, when in the second position hotkey functionality enabled can be "add" and disabled is "configure" and "remove." Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9B:
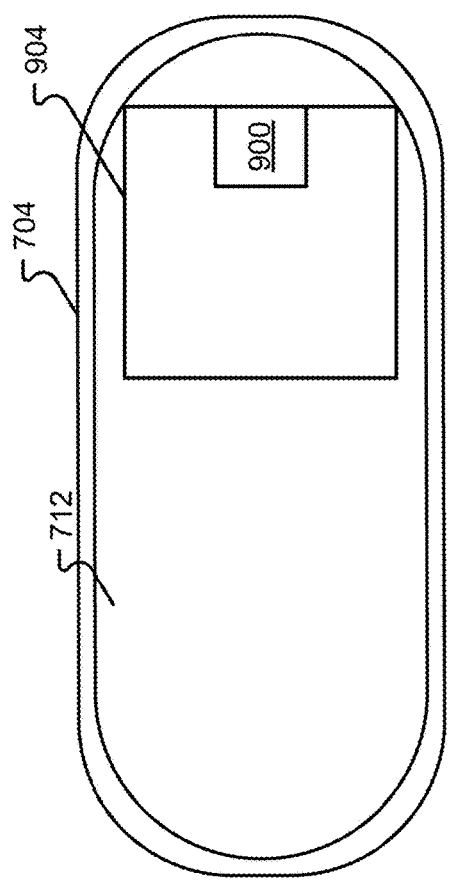
FIG. 9B is a bottom view of an embodiment of a remote control with the joystick in a lower position.
Figure 9C:
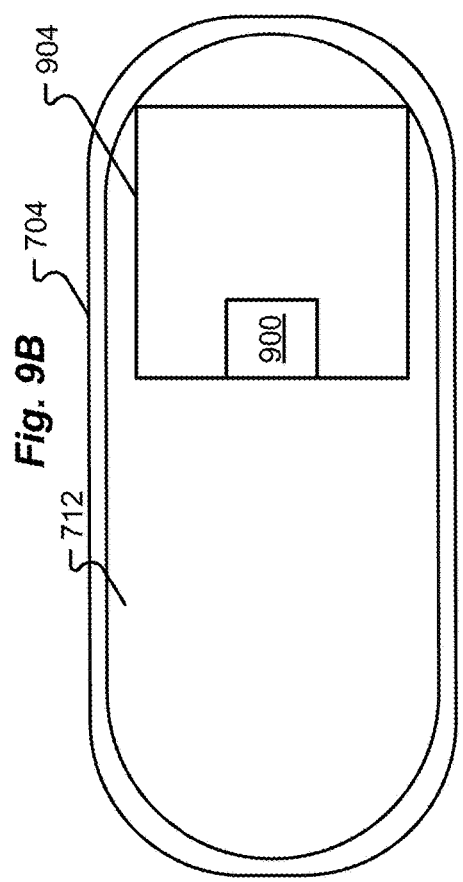
FIG. 9C is a bottom view of an embodiment of a remote control with the joystick in an upper position.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in an nonintrusive manner and without affecting the flow of content that is pushed up or down. The joystick 900 could be moved, additionally or differently, from side-to-side to cause the window to appear at the left or right edge of the screen 212.

Figure 10:
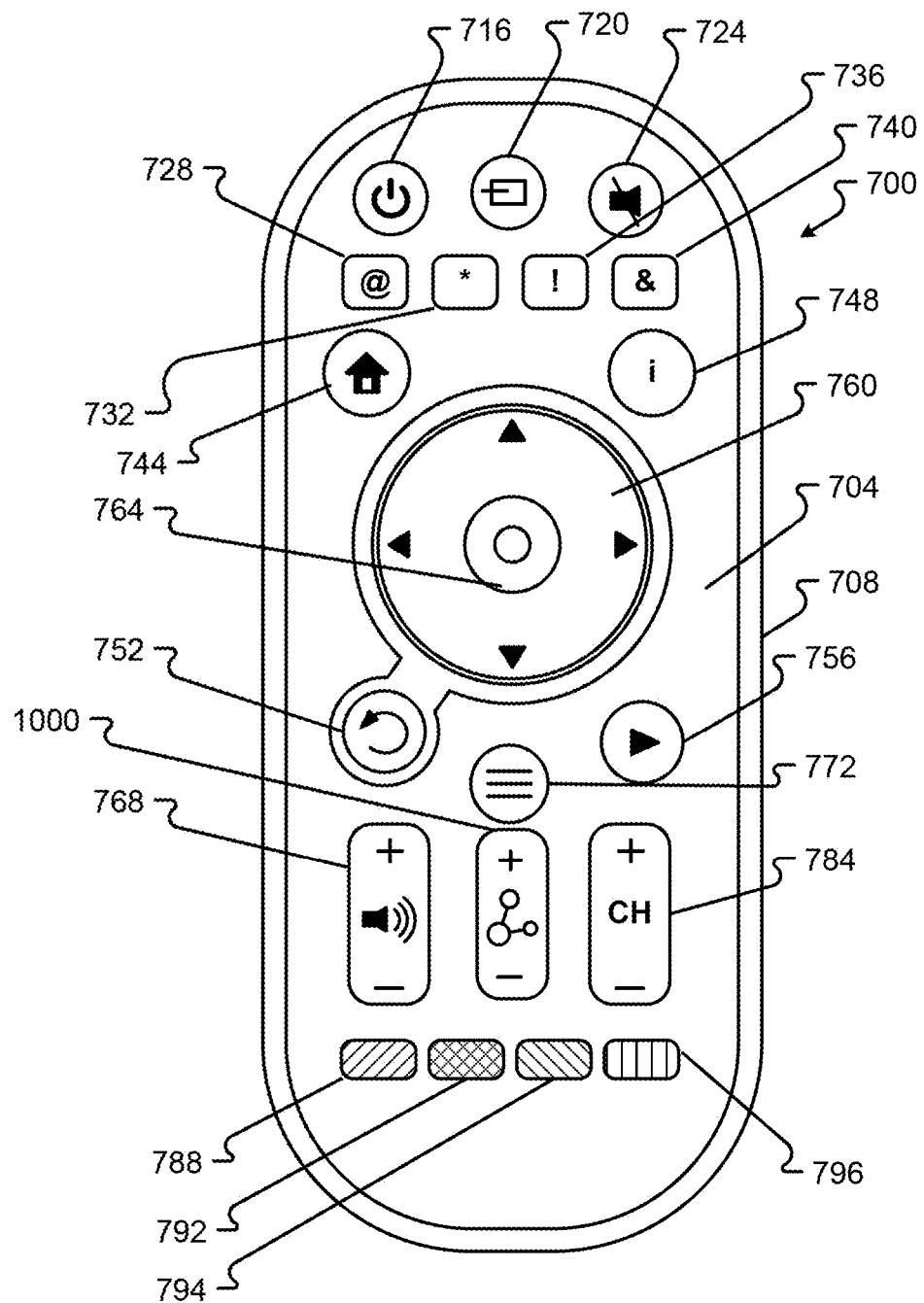
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, MySpace™, Twitter™, YouTube™, DailyMotion™, Facebook™, Google+™ or Second Life™ The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV 100. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
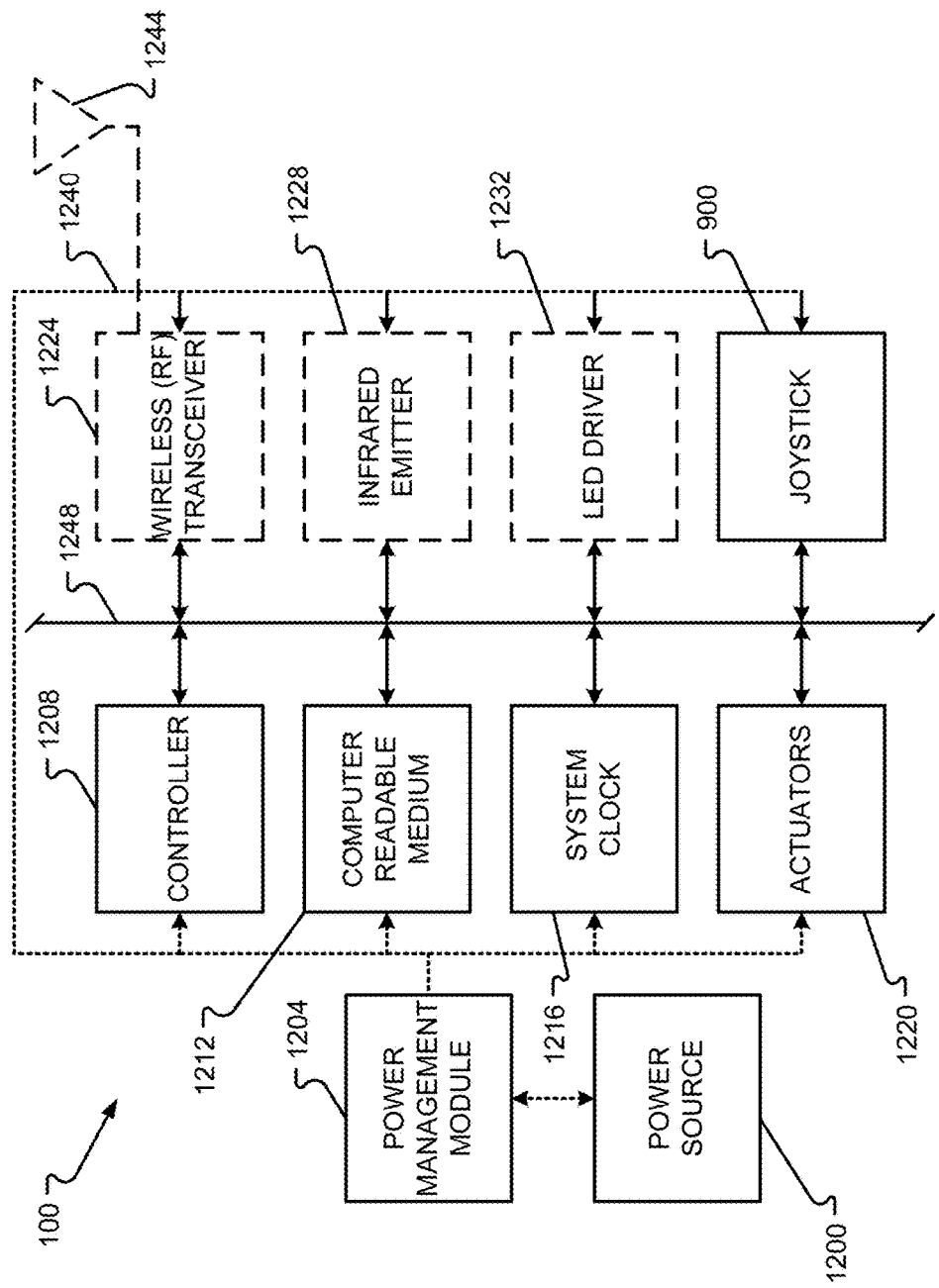
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
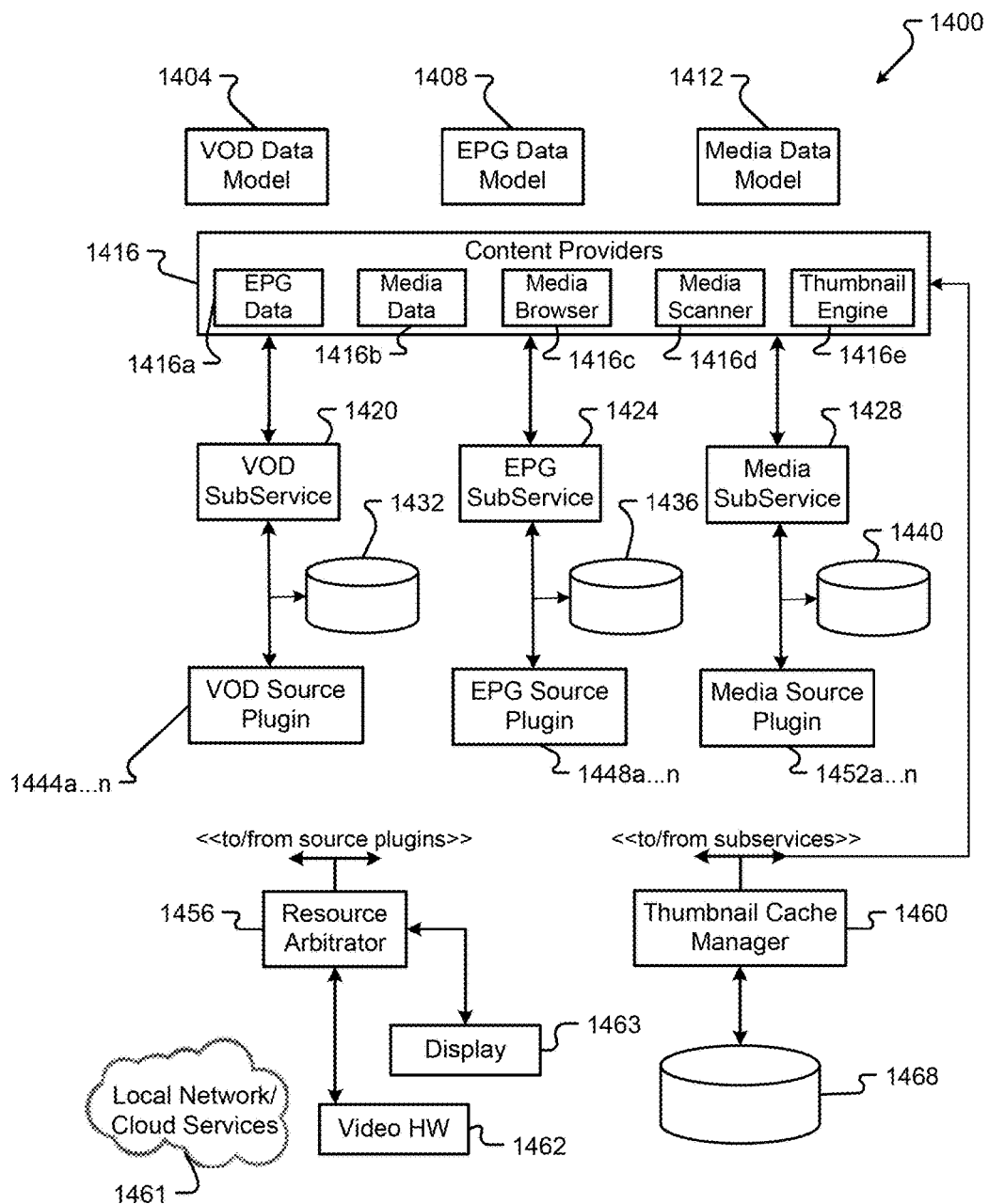
FIG. 14 is a block diagram of an embodiment of a data service.

FIG. 14 shows a data service 432 and the operation of the data management 1400 according to an embodiment. Similar to data management 600 shown with respect to FIG. 6, data management 1400 is supported by data service 432 according to another embodiment.

The data management 1400 includes one or more code components that are associated with different types of data. For example, code components may include codes associated with video on demand (VOD), electronic program guide (EPG), media data, and/or other codes. Codes components are executable and a part of data service 432. Data management may associate and access the code components as needed.

Each of the different types of data may include a data model (i.e., VOD data model 1404, EPG data model 1408, and media data model 1412). The data models define what and how information is to be stored by the data service. Thus, the data model can be defined to accommodate a variety of data sources without discriminating as to where the data comes from and how the data will be received or managed within the Intelligent TV system. Thus, the data models provide translation ability and/or affect the ability to translate data from one form to another to be used by the Intelligent TV 100.

The different types of data services (video on demand, electronic programming guide, media) each have a data subservice component (i.e., VOD subservice 1420, EPG subservice 1424, and media subservice 1428) that is in communication with one or more internal and/or external sources. Each data subservice component is in communication with the corresponding source plugins (i.e., VOD source plugins 1444*a-n* for VOD subservice 1420, EPG source plugins 1448*a-n* for EPG source subservice 1424, and media source plugins 1452*a-n* for media source subservice 1428).

In one implementation, the corresponding source plugins 1444*a-n*, 1448*a-n*, and 1452*a-n* can operate within the data management 1400 to interface, communicate, and/or query with external sources to gather data from these external sources. Plugins that communicate with external sources may be internally configured and provided by Intelligent TV 100. Plugins may also be provided and configured by third-parties such as an official plugin for the service provided by the external source or another third party which has developed a suitable plugin for Intelligent TV 100 to communicate with the external source using an API or other liked platform for the external source. Plugins are developed to interface with the corresponding subservice in Intelligent TV 100 for data management 1400.

For example, each of VOD source plugins 1444a-n may be configured to communicate with one specific VOD source or some plurality of VOD sources. Some VOD sources include dedicated media sources (i.e., over the internet), such as Amazon Instant Video, AOL Video, Blockbuster, DailyMotion, Google Play, Hulu, Joost, IPTV, iTunes Store, MetaCafe, NetFlix, Pandora, PlayStation Store, Vimeo, Voddler, Vudu, WatchESPN, YouTube, Xbox Video, or other dedicated distribution platforms and other content websites. Other VOD sources may include over-the-air or cable VOD sources with analog or digital feeds. Smart TV 100 may also access internal data storage (i.e., data storage 314) or other external storage (i.e., digital media library 148) that contains additional VOD media. Further, devices connected to Intelligent TV 100 (i.e., devices 168 or other devices accessible to Intelligent TV 100 over network 132) may also contain additional VOD media. Each of these media sources may have a corresponding VOD source plugin developed that can communicate with the specific media source. Further, third parties may develop a VOD source plugin that works with a number of media sources. Communication between the VOD source plugin may include from simply requesting and displaying a requested media or may include accessing the media library of the media source (i.e., listing new updates or additions, recommended media, listing media by genres, and/or other functions) and other functions.

In another example, EPG source plugins 1448a-n include plugins that are configured to communicate with various external sources. Exemplary EPG sources include analog or digital feeds from the content provider, the internet, and/or other sources.

Content provider modules (i.e., over-the-air, cable, and/or satellite channels) may have EPG information embedded with the content feed delivered to the user (i.e., as a subchannel of the main content feed). EPG information that are embedded with the content feeds by the content provider modules may contain only limited information due to technical (i.e., limited bandwidth) and content (i.e., rights to third-party generated EPG contents) limitations with embedding EPG information with content feeds.

The Internet is also a source of EPG information. A variety of EPG information is distributed over the Internet for equipment or computers that are directly connected to the Internet. EPG information over the Internet usually includes more detailed information regarding TV programming than with embedded EPG information in content feeds (i.e., detailed description of programming, reviews of programming, schedule, and future programmings). Further, EPG information over the Internet may also contain non-text contents such as preview images, videos, and sounds.

Other sources may also provide EPG information. In some instances, a collection of feeds (i.e., cable or satellite TV) may contain a specific channel dedicated to displaying EPG information. These EPG channels may contain video display of an analog or digital signal containing the EPG information (i.e., programming schedule in chart form). Other instances may include a feed containing EPG information in list form (i.e., for set-top boxes or digital video recorders (DVRs)).

An exemplary EPG source plugin receives and processes EPG information from a designated EPG information source. The EPG source plugin is configured to process the received EPG information according to the specific format of the corresponding designated EPG information source. For example, EPG information embedded with content feeds may contain limited information that are ordered in a pre-defined format (i.e., the order of other relevant information such as title, time, description, and/or other information about the programming). EPG information taken from an internet source may contain more detailed information but may require parsing to organize the relevant information within data management 1400. The EPG source plugin may further organize or translate the received information into a common data format to be stored in database 1436. In one implementation, EPG source plugins 1448a-n may convert or translate the received EPG information into a consistent data model for data management 1400 (i.e., EPG data model 1408) for consistency within data management 1400 and other reasons.

Media source plugins 1452a-n are configured to interface or communicate with the various media sources available to Intelligent TV 100. For example, media sources may include media content in connected devices 168 or other devices or media contents that are accessible to Intelligent TV 100 (i.e., via network 132). Each media source may contain content in a specific format (i.e., DVD, BluRay, and other digital or analog formats). Further, media from live feeds (i.e., from over-the-air broadcast, cable or satellite feeds, Internet feeds) are contents in a live format specific to the type of feed. Further, media contents and feeds from the various sources may also include metadata information embedded with these contents (i.e., closed captions, subtitles, and other information). In one implementation, media source plugins 1452a-n are configured to receive media contents and information for one or more of these media sources in a specific format.

Similar to as discussed with respect to the EPG source plugins 1448a-n, VOD source plugins 1444a-n and media source plugins 1452a-n may need to translate the various different media format and information received into a consistent model. In one implementation, information related to the VOD or media received from a corresponding VOD source plugin or media source plugin can be translated according to the respective VOD data model 1404 or media data model 1412 and stored into the respective storage 1432 or storage 1440. The VOD or media content received can be stored directly in the respective storage 1432 or storage 1440 or may be sent to the respective subservice without being stored. The format of the VOD or media can be decoded and played by Intelligent TV 100 directly using the information regarding format received. In another implementation, the VOD or media content received may be converted into a consistent format for all contents. This may be helpful for various display configurations (i.e., displaying as thumbnails, previews, etc.) depending on the hardware configurations and capabilities of Intelligent TV 100.

In a further embodiment, each source plugin may communicate with a plurality of different service providers and may not be grouped by criteria such as geographic area. For example, an EPG source plugin may be configured to work with EPG sources in a country (i.e., Canada providing fees in English and French) or a localized region (i.e., southwestern U.S. providing fees in English and Spanish) or feeds limited to only local stations in an area.

The data model, subservice, and source plugins for VOD, EPG, and media contents are discussed above according to an embodiment. In alternate embodiments, additional features may be included consistent with the framework discussed as known or may be derived by one skilled in the art.

Data management 1400 further includes a plurality of content provider modules 1416. Content provider modules 1416 works with the various data subservices (i.e., VOD subservice 1420, EPG subservice 1424, and media subservice 1428) to provide customized media data and information for applications 416 in Intelligent TV 100. Specifically, Content provider modules may serve applications 416 in Intelligent TV 100 with customized data and information related to live TV 452, VOD 456, media 460, application center 464, user interface 468, and/or other applications. Further, content provider modules 1416 may perform additional functions to organize or provide data in support of other content provider modules. Exemplary content provider modules include EPG data provider 1416a, media data provider 1416b, media browser 1416c, media scanner 1416d, and thumbnail engine 1416e.

In one example, EPG data provider 1416a is configured to serve applications with EPG information in a read-only format. In one implementation, EPG data provider 1416a works with EPG subservice 1424 to serve EPG information collected and stored in storage 1436. A relevant application in applications 416 may request EPG data provider 1416a to provide relevant EPG information as needed by the relevant application. For example, live TV 452 may display relevant EPG as a header when displaying a programming. Media center 460 may display relevant EPG information for selected programming when displayed or selected by the user via user interface 468.

In another example, media data provider 1416b is configured to provide personalized media metadata and stores the personalized media metadata into a database for further access. In one implementation, the personalized media metadata is stored in a sqlite database. The user may set up a personalized profile or preference for types, genres, or other preferred characteristics of media. The user may access and set up the profiles in a corresponding application. Alternatively, Intelligent TV 100 may contain pre-defined profiles and/or may automatically build a profile for a user by analyzing the user's past viewing preferences progressively. Media data provider 1416b may work with media subservice 1428, VOD subservice 1420, and/or other subservices. For example, media data provider 1416b uses the metadata regarding media collected by media subservice 1428 in order to generate the personalized media metadata.

Media browser 1416c is configured to provide a view of the media sources in real-time. Further media browser 1416c maintains a list of the connected media sources. In one implementation, media browser 1416c does not require any permanent storage as media browser 1416c is configured to collect real-time information. Media browser 1416c may work with VOD subservice 1420, media subservice 1428, and/or other subservices to gather information pertaining to a list of media sources and/or contents available. For example, media subservice 1428 may receive information pertaining to connected devices 168 and whether the connected devices 168 have accessible media contents via the respective media source plugins 1452a-n. Media browser 1416c may maintain a list of the connected devices 168 in real-time and may be accessible by the user directly or from other applications. In one implementation, media browser 1416c may run in the background or may be periodically run to update the list in real-time. This allows Intelligent TV 100 to have a list of connected media sources available without additional wait time to poll device information when the information is needed.

Media scanner 1416d is configured to provide a table of media using data retrieved from media browser 1416c. In one implementation, media scanner 1416d rescans the information periodically and updates the table of media. Media scanner 1416d may provide the table of media for applications such as media center 460 to display to the user the accessible media. In another implementation, media scanner 1416d may also work with EPG subservice 1424 to further populate the media table with updated EPG information.

Thumbnail engine 1416e is configured to collect and provide thumbnails for media, applications, and other contents. For example, thumbnail engine 1416e may collect or capture (i.e., screen capture a scene from available media) from a variety of subservices providing content or media (i.e., VOD subservice 1420, media subservice 1428). Thumbnail engine may also collect available thumbnails from EPG information via EGP subservice 1424. In one implementation, thumbnail engine 1416e may also collect and provide short video previews or scenes of media.

In an embodiment, thumbnail engine 1416e may also communicate with thumbnail cache manager 1460 and thumbnail storage 1468. Thumbnails for various programming may be needed for a number of applications for displaying programming information. Thumbnail cache manager 1460 may separately provide pre-cached thumbnails for the efficiency of displaying graphical thumbnails which consist of larger data blocks than text data such as EPG information. Thumbnail engine 1416e may also facilitate creating and maintaining the thumbnail cache for applications.

Resource arbitration 1456 may operate and facilitate communication between the subservices, source plugins, and various resources of Intelligent TV 100 that are external to data service 432. Thus, the resource arbitrator 1456 may communicate with cloud and/or network based storages 1461 or other types of external storage in the resources. In one implementation, the information from the storages 1461 may be accessible through the content provider modules 1416 to the sources plugins or the subservices as applications are accessible by Intelligent TV 100. In another implementation, the source plugins and the subservices may directly access storage resources through resource arbitrator 1456 depending on the hardware and for data efficiency reasons.

Resource arbitrator 1456 may further access other resources of the Intelligent TV 100, such as video hardware 1462, display 1463, and other resources. For example, resource arbitrator 1456 may directly access video hardware 1462 and display 1463 to decode and display programming having a variety of encodings (i.e., DVD, BluRay, various VOD native formats).

Figure 15:
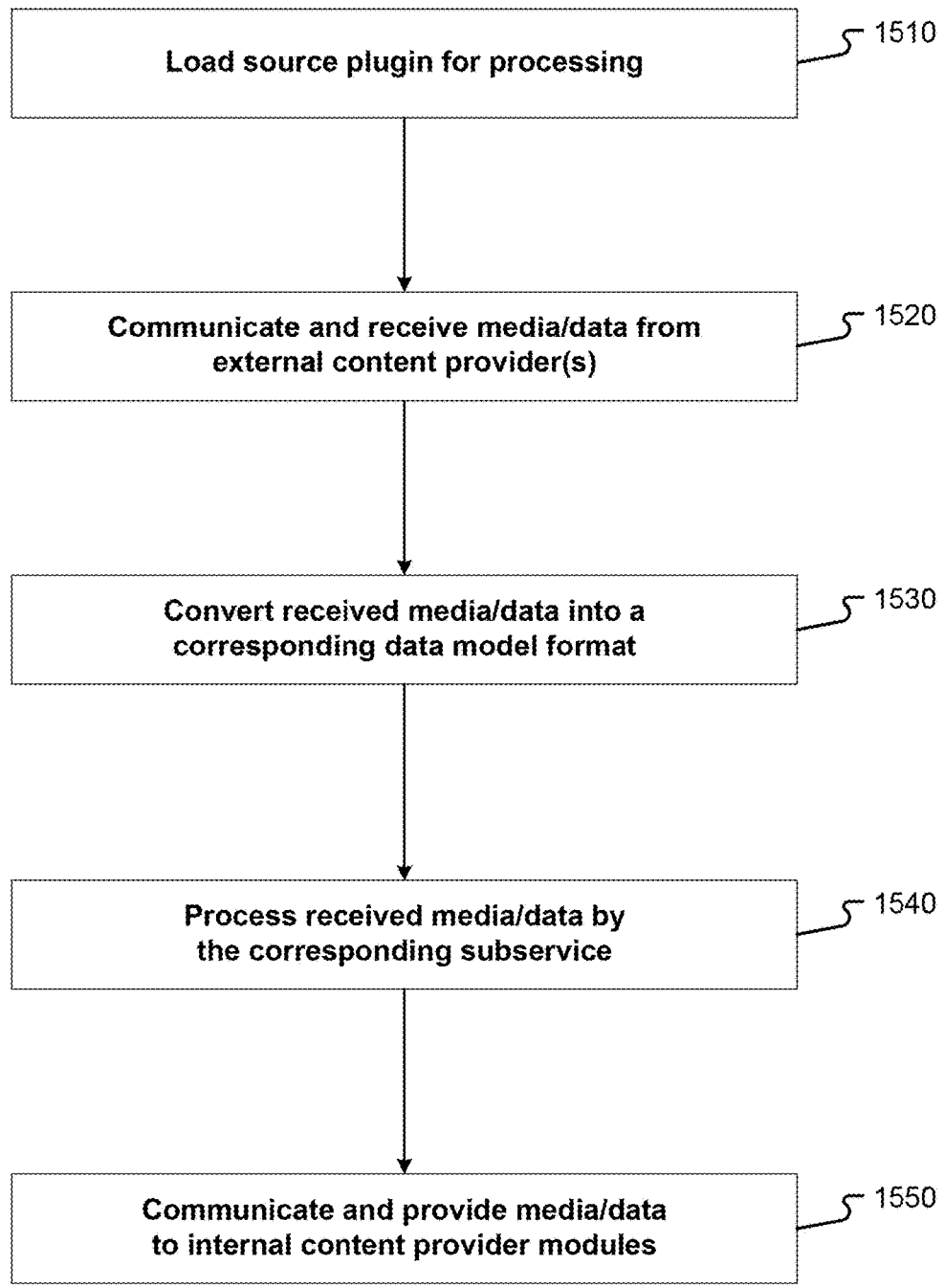
FIG. 15 is a flow diagram of an embodiment of a data management process.

FIG. 15 shows a flow diagram for processing received media or data from an external content provider 1500 for data management 1400 according to an embodiment.

Process 1500 starts by loading a source plugin for processing 1510. Data management 1400 may include a number of plugins defined for a number of corresponding external content and/or data providers. Exemplary source plugins may include VOD source plugins 1444a-n, EPG source plugins 1448a-n, and media source plugins 1452a-n. Each source plugin is configured to communicate with and receive information from one or more specific content and/or data provider. For example, VOD source plugins 1444a-n may communicate with dedicated media sources (i.e., over the internet), such as Amazon Instant Video, AOL Video, Blockbuster, DailyMotion, Google Play, Hulu, Joost, IPTV, iTunes Store, MetaCafe, NetFlix, Pandora, PlayStation Store, Vimeo, Voddler, Vudu, WatchESPN, YouTube, Xbox Video, or other dedicated distribution platforms and other content websites. Other VOD sources may include over-the-air or cable VOD sources with analog or digital feeds. EPG source plugins 1448a-n may communicate with analog or digital feeds from the content provider, the internet, and/or other sources. Media source plugins 1452a-n may communicate with media content in connected devices 168 or other devices or media contents that are accessible to Intelligent TV 100 (i.e., via network 132).

Process 1500 next communicates and receives media and/or data from the external content provider modules via the source plugins 1520. As discussed, the source plugins are configured to be able to communicate with and receive content from the external content provider modules. For example, the source plugins may access the external contents directly via an API provided by the external content provider. The source plugins may also be developed by a third party that may parse the content and/or information provided by the external content provider without accessing the content through an official API.

Process 1500 next converts the received media and/or data from the external content provider into a corresponding data model format 1530. Data management 1400 may have a number of data models for the internal storage and management of the received content and/or data. Exemplary data models include VOD data model 1404, EPG data model 1408, and media data model 1412. The received content from the various source plugins may be converted to the specific format handled by the respective data model. The data models provide uniform formats for the respective subservices (i.e., VOD subservice 1420, EPG subservice 1424, and media subservice 1428) and/or the internal content provider modules 1416 which interface with applications 416. In some implementations, step 1530 may be optional as the media and/or data may be sent to storage or be processed by data management 1400 without any conversion.

Process 1500 next processes the received media and/or data by the corresponding subservice 1540. Here, the respective subservices (i.e., VOD subservice 1420, EPG subservice 1424, and media subservice 1428) process the received media and/or data to be used by internal content provider modules 1416 and/or applications 416. This may include processing the received media and/or data according to the need of the internal content provider modules 1416 and/or applications 416. For example, a content provider such as EPG data provider 1416a may serve applications with EPG information in a read-only format. Therefore, EPG subservice 1424 may work with data provider 1416a to provide read-only access the EPG information stored in EPG storage 1436. EPG subservice 1424 may organize the EPG information such that only the most relevant information is sent to EPG data provider 1416a (i.e., EPG subservice 1424 may resolve conflicts between an Internet EPG source versus EPG information embedded in a content feed in order to provide the most detailed or up-to-date information sent to EPG data provider 1416a). Media data provider 1416b may require EPG information from EPG subservice 1424 as well as media information from VOD subservice 1420 or media subservice 1428 in order to provide personalized media metadata information to relevant applications. Therefore, these subservices may process the received media and/or data in order to provide the relevant information to media data provider 1416b for generating the personalized media metadata. Further, in one implementation, the subservices may need to allow access to storages 1432, 1436, and 1440 to media data provider 1416b in order to allow media data provider 1416b to store and access the personalized media metadata. In other implementations, media data provider 1416b may store the personalized media metadata in a dedicated database.

Process 1500 next communicates and provides the processed media and/or data to the various internal content provider modules 1416. In one implementation, the internet content provider modules 1416 are configured to communicate with and access the subservices responsive to user actions or schedule event from Intelligent TV 100 in order to generate and present information required for application 416. This process is discussed with respect to process 1600 in FIG. 16.

Figure 16:
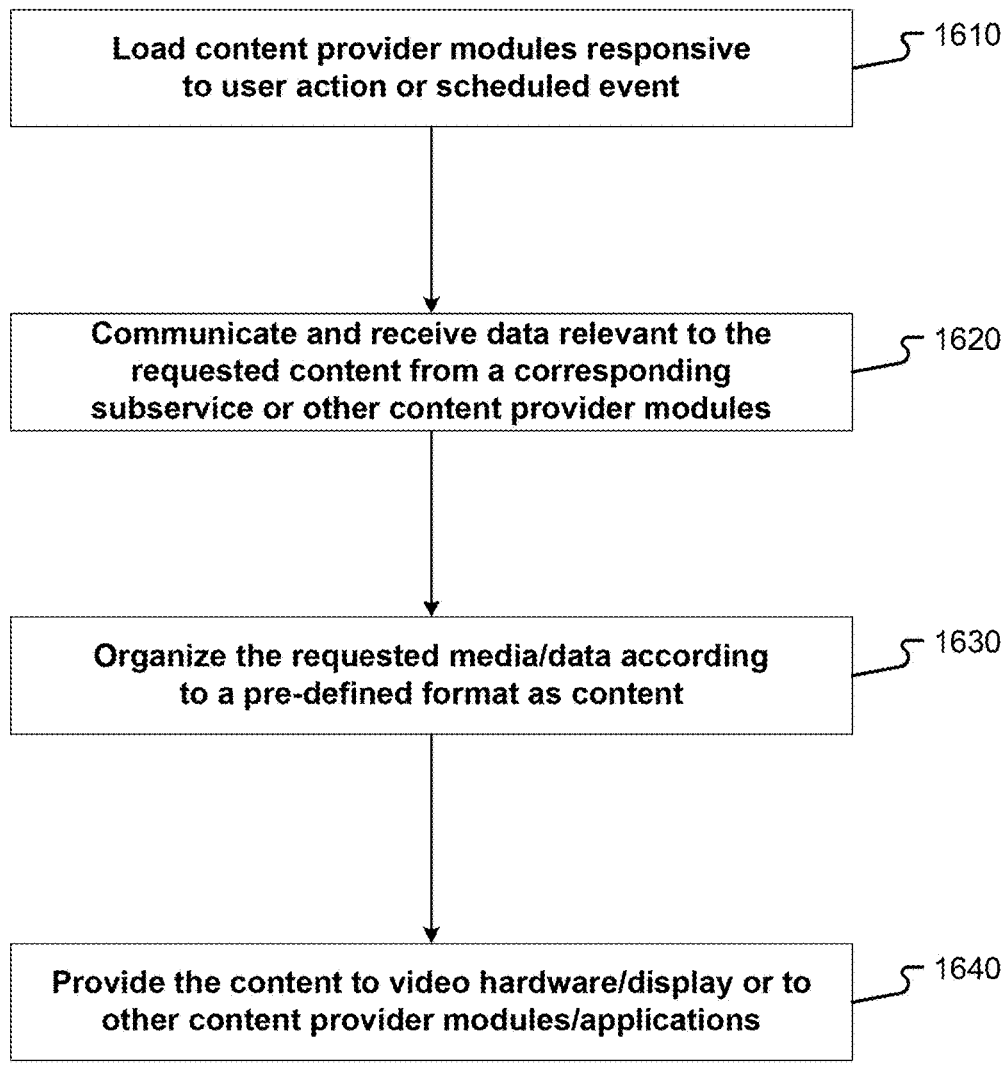
FIG. 16 is a flow diagram of an embodiment of a data management process.

FIG. 16 shows a flow diagram for providing media or data to an internal content provider 1600 for data management 1400 according to an embodiment.

Process 1600 starts by loading an internal content provider module in response to user action or schedule event 1610. In one implementation, an application 416 may request an internet content provider module to provide media and/or data to process or display to the user. An application may start by user action. For example, live TV 452 or video on demand 456 may request EPG information when the user changes the programming or channel which would display the header requiring EPG information. EPG and/or programming information may also need to be displayed when a user browses the media center 460 which may show a grid of programming available. Therefore, the relevant application 416 will load the corresponding internal content provider module 1416 for the media and/or data needed. Internal content provider modules 1416 may also load in response to scheduled events. For example, media browser 1416c provides a real-time view of media sources and maintains a list of connected media sources. Therefore, media browser 1416c may be loaded in the background and run continuously in order to update the list. As such, when applications such as media center 460 accesses the list of connected media sources, media browser 1416c may be able to provide a list in real-time without further delays to poll each connected media sources when the application requests such information.

Process 1600 next communicates with and receives media and/or data relevant to the requested content from the corresponding subservices or other content provider modules 1620. As discussed with respect to process 1500, the subservices (i.e., VOD subservice 1420, EPG subservice 1424, and media subservice 1428) processes and/or stores the received media and/or data from the external content provider modules. In one implementation, the media and/or data may be processed and stored as standard data models (i.e., VOD data model 1404, EPG data model 1408, and media data model 1412) in storages 1420, 1424, and 1428.

Process 1600 next organizes the requested media and/or data according to a pre-defined format as content 1630. As discussed with respect to process 1500, in step 1540, the content provider modules 1416 process the received media and/or data from the corresponding subservices 1420, 1424, and 1428. In one implementation, each of the content provider modules 1416 is configured to serve the relevant applications 416 with information. The content provider modules will need to process the received media and/or data (i.e., in the forms of data models 1404, 1408, and 1412) and organize such media and/or data into a pre-defined format for use by the relevant applications 416.

For example, EPG data provider 1416a serves applications with EPG information in a read-only format. As such, EPG data provider 1416a may transmit EPG information received from EPG subservice 1424 in EPG data model

1408 without modification. In another example, media data provider 1416*b* provides personalized media metadata and stores data in a sqlite database. As such, media data provider 1416*b* may receive media and information from VOD subservice 1420, EGP subservice 1424, and media subservice 1428. Media data provider 1416*b* will also organize the media and data received from these subservices to generate the personalized media metadata and further store the generated metadata into the sqlite database. The relevant application may simply access the database for the personalized media metadata.

Process 1600 next provides the content to video hardware and/or display or to other content provider modules and/or application 1640. In one implementation, the content provider 1416 may access and provide content directly to the video hardware 1462 and/or display 1463 via resource arbitrator 1456. For example, the media content provider modules (i.e., media data provider 1416*b*, media browser 1416*c*, and media scanner 1416*d*) may provide media content directly to video hardware 1462 and/or display 1463, such that the media content may display directly the video without processing by an application. This may have the benefit in reducing processor-intensive video processing and/or other benefits. Contents from content provider modules 1416 may also have provided to other relevant content provider modules 1416 and/or applications 416.

Figure 17:
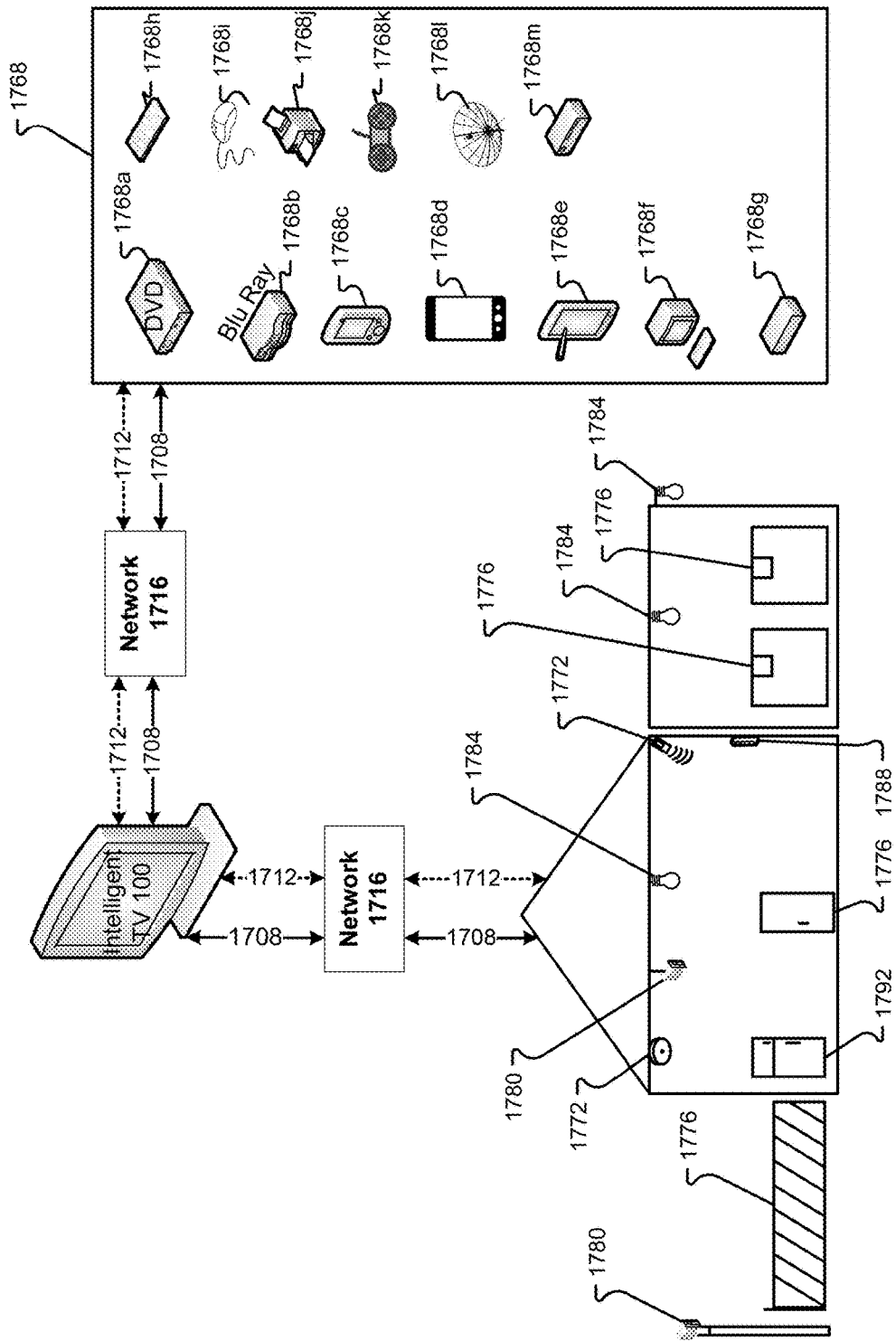
FIG. 17 shows a view of an embodiment of an environment with Digital Living Network Alliance (DLNA) inter-operating devices or a intelligent television.

FIG. 17 shows a view of an embodiment of an environment with Digital Living Network Alliance (DLNA) interoperating devices for an intelligent television.

Similar to Intelligent TV 100 as shown in FIG. 1B, Intelligent TV 1700 can interact with other electronic devices 1768 by either the wired 1708 and/or wireless 1712 connections. As described herein, components of the Intelligent TV 1700 allow the device 1700 to be connected to devices 1768 including, but not limited to, DVD players 1768*a*, BluRay players 1768*b*, portable digital media devices 1768*c*, smart phones 1768*d*, tablet devices 1768*e*, personal computers 1768*f*, external cable boxes 1768*g*, keyboards 1768*h*, pointing devices 1768*i*, printers 1768*j*, game controllers and/or game pads 1768*k*, satellite dishes 1768*l*, external display devices 1768*m*, and other universal serial bus (USB), local area network (LAN), Bluetooth™, high-definition multimedia interface (HDMI) compliant devices, and/or wireless devices. When connected to an external cable box 1768*g* or satellite dish 17681, the Intelligent TV 1700 can access additional media content. Also, as further described below, the Intelligent TV 1700 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 1700 may also be used to control the operation of, and may interface with, other smart components such as security systems 1772, door/gate controllers 1776, remote video cameras 1780, lighting systems 1784, thermostats 1788, refrigerators 1792, and other appliances.

In one configuration, wired 1712 and wireless 1716 connections connect Intelligent TV 1710 and the various devices as discussed over network 1716 with DLNA capabilities. Under DLNA standard, the connected devices may further have interoperability capabilities that enable sharing of digital media between the devices. For example, each DLNA capable device may use Universal Plug and Play (UPnP) to discover and connect to other DLNA capable devices within wired 1712 and wireless 1716 connections. Further capabilities include managing media in other DLNA devices of controlling the functions of other DLNA devices.

Intelligent TV 1700 may be a DLNA home network device. Intelligent TV 1700 may include modules that act as a Digital Media Player (DMP) configured to find content on Digital Media Servers (DMS) and provide playback and rendering capabilities. For example, Intelligent TV 1700 may connect, through network 1716, with DLNA capable digital media player (DMP) devices such as DVD player 1768*a*, Blu-ray player 1768*b*, and other devices. Intelligent TV 1700 may also connect, through network 1716, with DLNA capable digital media controller (DMC) devices such as smart phone 1768*d*, tablet 1768*e*, and other devices.

In one implementation, data service 1400 may include a DLNA subservice as an additional subservice that is configured to connect and interact with the various DLNA devices through network 1716. The DLNA subservice may contain a single instance of an UPnP/DLNA stack and may run periodic discovery scans for other DLNA devices on the network 1716. The DLNA subservice may add or remove devices from the UPnP/DLNA stack when new DLNA devices are added to network 1716 or has been removed from the network.

The DLNA subservice may also work with content provider modules 1416 such as media browser 1416*c* or media scanner 1416*d*. As discussed above, media browser 1416*c* is configured to maintain a list of the connected media sources of Intelligent TV 1700 and to provide a real-time view of the connected media sources; media scanner 1416*d* is configured to populate a media table using the data of the connected media sources retrieved from media browser 1416*c*. In one implementation, the DLNA subservice facilitates the processes of media browser 1416*c* and media scanner 1416*d* by notifying media browser 1416*c* or media scanner 1416*d* of any status changes to connecting or connected DLNA devices (i.e., when DLNA devices are discovered or disconnected).

In another implementation, media browser 1416*c* may further retrieve content data from DLNA devices. Media browser 1416*c* may contain a plug-in that periodically communicates with and retrieves metadata from DLNA content servers. Further, media scanner 1416*d* may aggregate the metadata retrieved by media browser 1416*c* with other data regarding contents in non-DLNA devices as a unified metadata for the media table.

In another configuration, Intelligent TV 1700 may include and use alternative protocols to DLNA for digital media sharing between capable devices as known or may be later derived in the art (i.e., Apple's Digital Audio Access Protocol (DAAP)).

Figure 18:
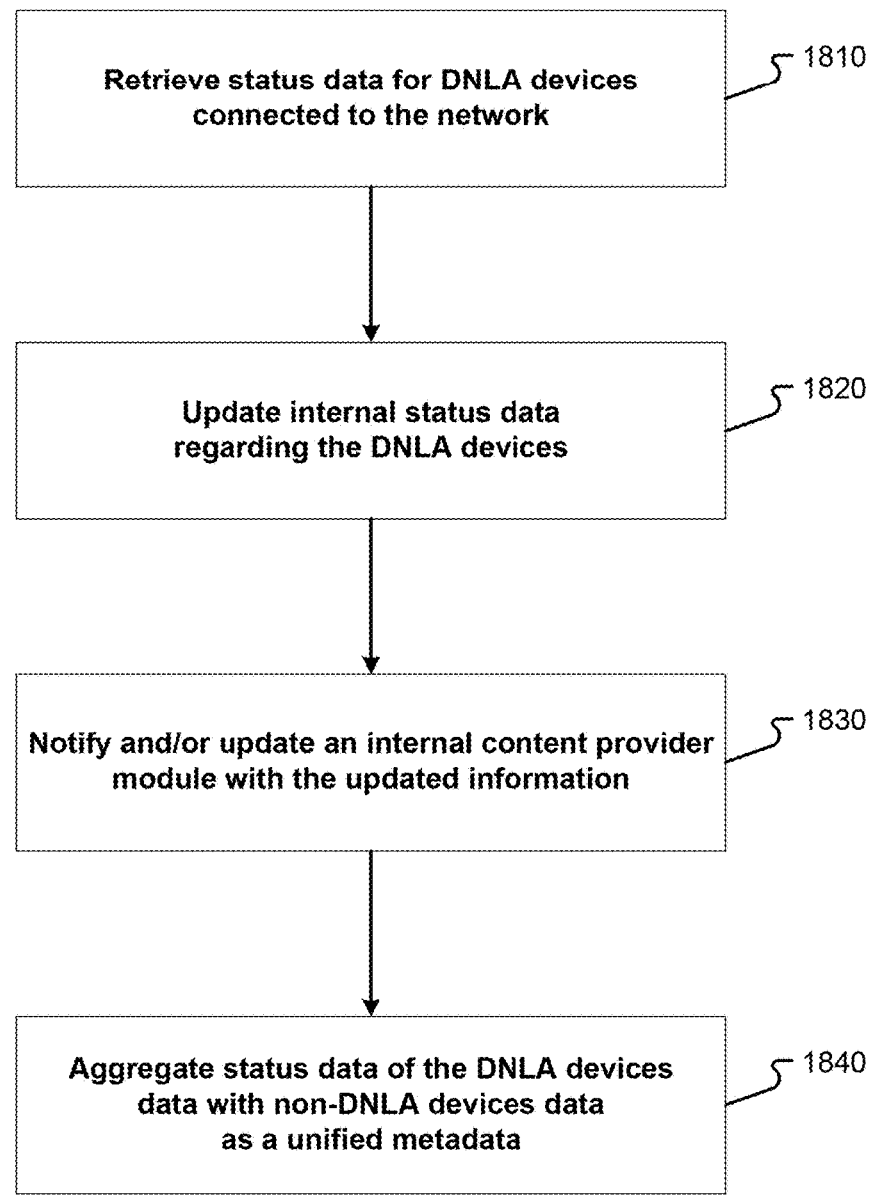
FIG. 18 shows a flow diagram for scanning and processing DLNA devices for an Intelligent TV.

FIG. 18 shows a flow diagram for scanning and processing DLNA devices for an Intelligent TV 1700 according to an embodiment.

Process 1800 starts with retrieving status data for DNLA devices that are connected the network 1810. In one configuration, Intelligent TV 1700 and a plurality of DNLA devices are all connected through a network 1716. Network 1716 may be IP based and may involve networking communication technologies such as Ethernet, Wi-Fi 802.11 (a, b, g, n), Bluetooth, phoneline networking (e.g., Home Phoneline Networking Alliance (HPNA)), coaxial cable networking (e.g., Multimedia over Coax Alliance (MoCA)), Wi-Fi Direct, and other technologies. Intelligent TV 1700 and the DNLA devices may use IP over network 1716 to connect and communicate with other devices as well as the Internet.

A typical DLNA device may send status change data on discovery (i.e., device is first powered on and connected to network 1716) or disconnection. In the functional component "Device Discovery and Control" for a DLNA device, status change data may be implemented through the UPnP) device architecture. For example, once a newly powered on DLNA device connects to network 1716 and has established an IP address, the DLNA device may initiate UPnP discovery under the Simple Service Discovery Protocol (SSDP) to advertise its services to other DLNA devices in the network. In another example, Intelligent TV 1700 may be first powered on and establishes an IP address in network 1716; Intelligent TV 1700 may then search for DLNA devices already connected to network 1716 before Intelligent TV 1700 via the SSDP protocol.

Intelligent TV 1700 may also retrieve further media capabilities related status data for the DINA device using the "Media Management and Control" function using UPnP Audio-Video (AV) protocol. For example, a connected device may be an UPnP AV media server that provides media library information or streaming media content (i.e., DVD player 168a, Blu-Ray player 168b, Internet connected computer 168f, hard drive with media content 168g). These connected devices may further include status data including the Quality of Service (QoS) information for streaming media over network 1716, rending control information for its media (i.e., volume, brightness, color, sharpness), remote access or control information (i.e., recording, scheduling, playing, pausing, stopping), and other status data. The connected device may also include other data such as a list of content or other information provided by the device. These statuses and other data may be updated and sent by the DLNA device to the network 1716 as needed and be retrieved by Intelligent TV 1700.

Next, Intelligent TV 1700 updates internal status data regarding the DNLA devices 1820. In one implementation, Intelligent TV 1700 may keep track of the statuses for all DNLA devices connected to network 1716 internally through a data subservice 1400. For example, Intelligent TV 1700 may include a data subservice DLNA service dealing the communications from the DNLA devices and storing and/or update the DNLA devices status data (i.e., in a temporary or permanent storage in a specialized formatted list).

In storing and updating the DNLA status data, this process may involve adding the DMA device with status data to the list when the device is first connected to the network, deleting the device from the list when the device disconnects, and updating the device on the list with new capabilities and data when the device broadcasts a status change. In another implementation, a device may be added and updated only when it is an approved or relevant DNLA device for Intelligent TV 1700.

In one implementation, the DNLA subservice may also contain a single instance of a UPnP/DLNA stack that realizes the DLNA functionalities. As such, in one configuration, the DNLA subservice may perform at least some of the functions of retrieving the status data from the DNLA device 1810 using the implemented UPnP/DLNA stack. In a further configuration, the DLNA subservice may run periodic discovery scans for other DLNA devices on the network which have not been added to Intelligent TV 1700 using UPnP.

Next, Intelligent TV 1700 aggregates the DNLA status data with non-DNLA devices data as a unified metadata 1740.

Generally, non-DNLA devices do not use the IMO protocol and do not broadcast their connection or status changes. As such, non-DNLA devices are discovered by Intelligent TV 1700 using an alternate method. For example, each connected devices 1768 may connect with Intelligent TV 1700 through various ports including through network 1716. Devices connected through each port 168 may communicate with Intelligent TV 1700 via an individual protocol (i.e., DVD player 1768a and Blu Ray player 1768b may connected with Intelligent TV 100 through High-Definition Multimedia Interface (HDMI), Digital Visual Interface (DVI), RCA connector, composite video interface, Bayonet Neill-Concelman (BNC) connector, and/or other interfaces, wireless phone 1768d, computing tablet 1768e, and hard disk 1768g may connect with Intelligent TV 100 through wireless or wired Ethernet interfaces through network 1716 but not using the UPnP protocol).

Intelligent TV 1700 may discover and update the status data of these non-DNLA devices according to the respective interface and protocol. For example, a digital video interface such as HDMI and DVI may transfer status information regarding the connected device (i.e., device name, capabilities such as supported resolution); Intelligent TV 1700 can obtain status information from these devices without needing an accompanying video feed, Devices on other interfaces, such as analog video interfaces (i.e., RCA or BNC interface), may only provide status information embedded in the analog video feed (i.e., displaying information on a blue screen as an analog video feed); as such, Intelligent TV 1700 may only obtain basic information (such as that the device is connected) when the Intelligent TV 1700 detects such a video feed from the device. Therefore, the list of non-DNLA devices and their status data may be updated with information and at frequency dependent on the specific interface of the device with Intelligent TV 1700. For example, analog interfaces may be polled by Intelligent TV 1700 at certain intervals for updates, while digital interfaces may transmit status data as the data is passed along. Further details on status data for non-DNLA devices is as discussed above with respect to internal content provider modules (i.e., media browser 1416c and media scanner 1416d with respect to FIG. 14).

The DNLA status data separately obtained and updated as opposed to non-DNLA devices may be aggregated as a unified metadata. In one implementation, DNLA status data may be merged with non-DNLA status data. For example, the unified metadata may have common fields for status information such as for the type, video resolution, and connection status of the connected devices, Some fields may be DNLA devices or non-DMA devices specific such as UPnP capabilities for DNLA devices and the interface type connected to Intelligent TV 1700 for non-DNLA devices.

Further, DNLA devices automatically update the status data to Intelligent TV 1700 through UPnP as oppose to needing to be polled by Intelligent TV 1700 for some non-DNLA devices. As such, in one implementation, Intelligent TV 1700 may update the unified metadata with DNLA status data as soon as the Intelligent TV 1700 has received and processed the status data from UPnP. In another implementation, the updated DNLA status data is periodically merged with non-DNLA devices data as unified metadata.

As discussed above with respect to internal content provider modules 1416 with respect to FIG. 14, the media browser 1416c and the media scanner 1416d maintain and/or use a list of connected devices, such as devices 1768. In particular, media scanner 1416d is configured to scan for non-DLNA devices connected to Intelligent TV 1700 and update the list of non-DLNA devices periodically. The DLNA service may work media scanner 1416*d* to update the list of devices with DNLA devices that have status changes with the unified metadata (i.e., the DLNA service notifies media scanner 1416*d* with the updated DNLA status data and media scanner 1416*d* updates the list of connected devices). In another implementation, the media browser 1416*c* may also include a plug-in for retrieving the metadata from the DLNA service and/or DLNA content servers which contain data regarding contents in DLNA devices. Media scanner 1416*d* may also aggregate unified metadata retrieved from the media browser content provider modules.

The exemplary systems and methods of this disclosure have been described in relation to data service function for Intelligent TV. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing external devices connected through a network for an intelligent television (TV), comprising:
   scanning, by a hardware processor, the network for external devices;
   retrieving status data for a first external Digital Living Network Alliance (DLNA) device through the network, wherein the status data for the first external DLNA device comprises one or more of Quality of Service (QoS) information, rending control information, and video resolution of the first external DLNA device;
   updating, by the hardware processor, an internal status data for the first external DLNA device in the Intelligent TV using the retrieved status data;
   discovering, by the hardware processor, a first external non-DLNA device on the network;
   obtaining, by the hardware processor, status data for the first external non-DLNA device through the network, wherein the status data for the first external non-DLNA device comprises one or more of Quality of Service (QoS) information, rending control information, and video resolution of the first non-external DLNA device;
   updating, by the hardware processor, an internal status data for the first external non-DLNA device through the network;
   updating, by the hardware processor, a unified metadata, comprising aggregating the updated internal status data for the first external DLNA device with the updated internal status data for the first external non-DLNA device;
   determining, by the hardware processor, a change in the unified metadata;
   based on the determined change in the unified metadata, notifying, by the hardware processor, an internal content provider module of the Intelligent TV with the aggregated updated internal status data; and
   providing, by the hardware processor, a real-time view of media sources of the Intelligent TV by a media browser plug-in.

2. The method of managing external devices of claim 1, further comprising aggregating the updated internal status data with status data for other devices connected through the network.

3. The method of managing external devices of claim 2, wherein aggregating the updated internal status data with status data for other devices connected through the network is performed by an internal content provider module of the Intelligent TV.

4. The method of managing external devices of claim 3, wherein the internal content provider module comprises one or more of a media scanner and a media browser.

5. The method of managing external devices of claim 1, wherein the first external DLNA device communicates with the Intelligent TV using the Universal Plug and Play (UPnP) protocol.

6. The method of managing external devices of claim 1, wherein the retrieved status data for the first external DLNA device is sent by the first external DLNA device on one or more of a connection of the first external DLNA device to the network, a disconnection of the first external DLNA device from the network, and a change of status to the first external DLNA device.

7. The method of managing external devices of claim 1, wherein the status data for the first external DLNA device comprises one or more of device discovery data, device disconnection data, and media data.

8. An intelligent television (TV), comprising:
   a Digital Living Network Alliance (DLNA) subservice that:
   scans a network for a plurality of external DLNA devices;
   retrieves status data from the plurality of external DLNA devices connected through the network and update internal status data for the plurality of external DLNA devices in the Intelligent TV using the retrieved status data, wherein the status data for the plurality of external DLNA devices comprises one or more of Quality of Service (QoS) information, rending control information, and video resolution of the plurality of external DLNA devices;
   a non-DLNA subservice that:
   discovers a plurality of external non-DLNA devices connected through the network;
   retrieves status data from the plurality of external non-DLNA devices connected through the network and update internal status data for the plurality of external non-DLNA devices in the Intelligent TV using the retrieved status data, wherein the status data for the plurality of external non-DLNA devices comprises one or more of Quality of Service (QoS) information, rending control information, and video resolution of the plurality of external non-DLNA devices;
a media browser plug-in that:
retrieves status data from the DLNA subservice and the non-DLNA subservice;
aggregates the retrieved status data;
updates a unified metadata comprising aggregating the retrieved status data;
notifies an internal content provider module;
provides a real-time view of media sources of the Intelligent TV; and
the internal content provider that:
maintains a list of connected media sources of the Intelligent TV using the status data retrieved by the DLNA subservice and the non-DLNA subservice.

9. The Intelligent TV of claim 8, wherein the media browser plug-in further retrieves metadata from the plurality of DLNA devices that are DLNA content servers.

10. The Intelligent TV of claim 8, further comprising a media scanner that populates a media table using data retrieved by the media browser.

11. The Intelligent TV of claim 8, wherein the media browser plug-in is further configured to aggregate the updated internal status data with status data for other devices connected through the network.

12. A non-transitory computer-readable storage medium having computer readable program code embodied therewith, wherein the computer readable program code when executed by a processor is configured to perform the steps of:
scanning a network for external devices;
retrieving status data of a Digital Living Network Alliance (DLNA) device connected through the network, wherein the status data of the DLNA device comprises one or more of Quality of Service (QoS) information, rending control information, and video resolution of the DLNA device;
updating an internal status data for the DLNA device in the Intelligent TV using the retrieved status data for the DLNA device;
obtaining status data for a non-DLNA device connected through the network, wherein the status data for the non-DLNA device comprises one or more of Quality of Service information, rending control information, and video resolution of the non-DLNA device;
updating the internal status data for the non-DLNA device in the Intelligent TV using the obtained status data for the non-DLNA device;
updating a unified metadata, comprising aggregating the updated internal status data for the DLNA device with the non-DLNA device;
determining a change in the unified metadata;
based on the determined change in the unified metadata, notifying an internal content provider module of the Intelligent TV with the updated internal status data; and
providing a real-time view of media sources of the Intelligent TV by a media browser plug-in.

13. The non-transitory computer-readable storage medium of claim 12, wherein the internal content provider module comprises one or more of a media scanner and a media browser.

14. The non-transitory computer-readable storage medium of claim 13, wherein the media scanner is configured to populate a media table using data retrieved by the media browser.

15. The non-transitory computer-readable storage medium of claim 12, wherein the DLNA device communicates with the Intelligent TV using the Universal Plug and Play (UPnP) protocol.

16. The non-transitory computer-readable storage medium of claim 12, wherein the retrieved status data for the DLNA device is sent by the DLNA device on one or more of a connection of the DLNA device to the network, a disconnection of the DLNA device from the network, and a change of status to the DLNA device.

17. The non-transitory computer-readable storage medium of claim 12, wherein the status data for the DLNA device comprises one or more of device discovery data, device disconnection data, and media data.

18. The non-transitory computer-readable storage medium of claim 12, wherein the computer readable program code is further configured to perform the step of aggregating the updated internal status data with status data for other devices connected through the network.

* * * * *